(12) United States Patent
Inkpen et al.

(10) Patent No.: US 7,983,785 B2
(45) Date of Patent: Jul. 19, 2011

(54) FIBRE MONITORING APPARATUS AND METHOD

(75) Inventors: Stuart Inkpen, St. Phillips (CA); Chris Nolan, St. John's (CA); Darryl Pike, St. John's (CA); Heather Rowe, St. John's (CA); John Hall, St. John's (CA); Dana Linfield, Portugal Cove-St. Phillips (CA); Joshua Swamidas, St. John's (CA); Chris Dawson, St. John's (CA); Gerard Galway, Torbay (CA); Shawn Walsh, St. John's (CA); Ruth Abraham, St. John's (CA)

(73) Assignee: Instrumar Limited, St. Johns, Newfoundland (CA)

( * ) Notice: Subject to any disclaimer, the term of this patent is extended or adjusted under 35 U.S.C. 154(b) by 1846 days.

(21) Appl. No.: 10/883,569

(22) Filed: Jun. 30, 2004

(65) Prior Publication Data

US 2006/0064196 A1    Mar. 23, 2006

(51) Int. Cl.
*G06F 19/00* (2011.01)
(52) U.S. Cl. .................................... 700/143
(58) Field of Classification Search .............. 700/130, 700/142, 143; 264/165; 340/677; 57/81; 66/163; 250/548, 559.01; 324/674, 663
See application file for complete search history.

(56) References Cited

U.S. PATENT DOCUMENTS

| | | | |
|---|---|---|---|
| 3,863,241 A | | 1/1975 | Kamiyamaguchi et al. |
| 4,491,831 A | | 1/1985 | Sakai et al. |
| 4,610,707 A | * | 9/1986 | Grundy ............................ 65/377 |
| 4,706,014 A | | 11/1987 | Fabbri |
| 4,713,655 A | * | 12/1987 | Sommer et al. ............... 340/677 |
| 4,881,062 A | * | 11/1989 | Makino et al. ................. 340/677 |
| 4,888,944 A | | 12/1989 | Felix |
| 5,142,856 A | | 9/1992 | Nakayama et al. |
| 5,270,951 A | * | 12/1993 | Deters et al. .................... 702/43 |
| 5,365,163 A | | 11/1994 | Satterwhite et al. |
| 5,394,096 A | | 2/1995 | Meyer |
| 5,394,340 A | | 2/1995 | Inkpen et al. |
| 5,440,870 A | * | 8/1995 | Neumann ....................... 57/265 |
| 5,469,149 A | * | 11/1995 | Binner et al. .................. 340/677 |
| 5,621,332 A | | 4/1997 | Inkpen et al. |
| 5,682,146 A | * | 10/1997 | Neumann ..................... 340/677 |
| 5,828,773 A | | 10/1998 | Setlak et al. |
| 5,844,494 A | * | 12/1998 | Spahlinger et al. ........... 340/677 |
| 5,943,907 A | | 8/1999 | Ghorashi et al. |
| 6,025,727 A | * | 2/2000 | Inkpen et al. ................. 324/674 |
| 6,380,548 B1 | | 4/2002 | Henze et al. |

(Continued)

FOREIGN PATENT DOCUMENTS

CA           2254426           5/1999

(Continued)

*Primary Examiner* — Gary L. Welch
*Assistant Examiner* — Nathan E Durham
(74) *Attorney, Agent, or Firm* — Greenberg Traurig LLP

(57) ABSTRACT

A computer-based fibre production monitoring system includes at least one sensor, and a computer server in communication with the sensors. Each sensor is configured to provide data packets each being associated with a respective threadline and providing a measurement of at least one physical characteristic of a fibre as it is drawn past the sensor on the threadline and wound onto a bobbin. The computer server is configured to provide an analysis of the physical characteristics on a per-threadline basis and/or per-bobbin basis from the measurements. The sensor is configured as an electric field sensor, and includes an insulating substrate, non-contacting electrodes disposed on the substrate, and vias extending transversely through the substrate. The electrodes are interlaced with one another. One portion of the vias is coupled to one portion of the electrodes, and another portion of the vias is coupled to another portion of the electrodes.

16 Claims, 17 Drawing Sheets

U.S. PATENT DOCUMENTS

| | | | |
|---|---|---|---|
| 6,402,079 B1 | 6/2002 | Hermanns et al. | |
| 6,650,959 B1 | 11/2003 | Bouvyn | |
| 6,725,639 B2 | 4/2004 | Ishii et al. | |
| 2002/0157223 A1* | 10/2002 | Kusuzono et al. | 28/186 |

FOREIGN PATENT DOCUMENTS

| | | |
|---|---|---|
| JP | 11-121320 | 4/1999 |
| WO | WO 99/35075 | 7/1999 |
| WO | WO 99/36746 | 7/1999 |

* cited by examiner

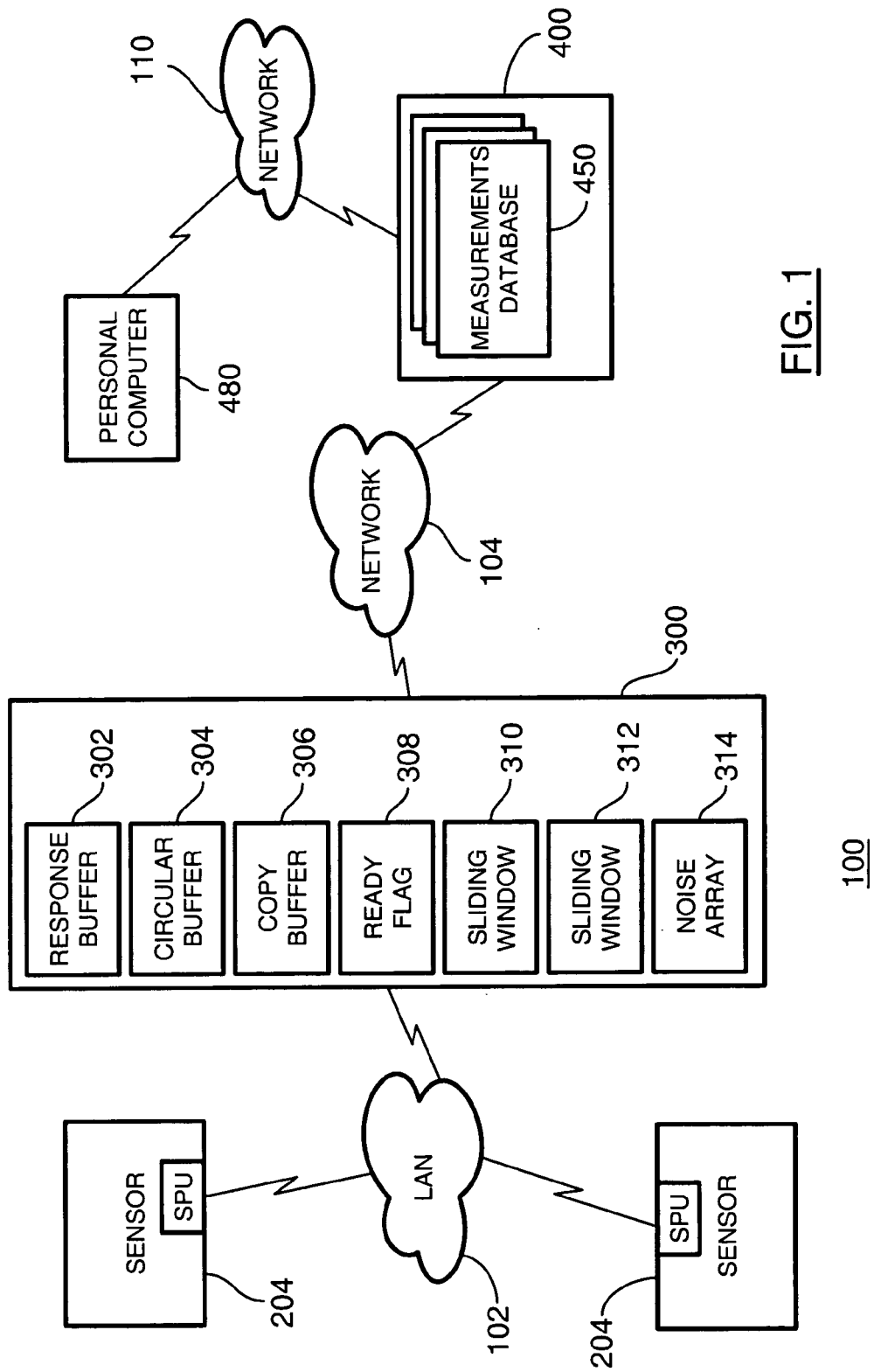

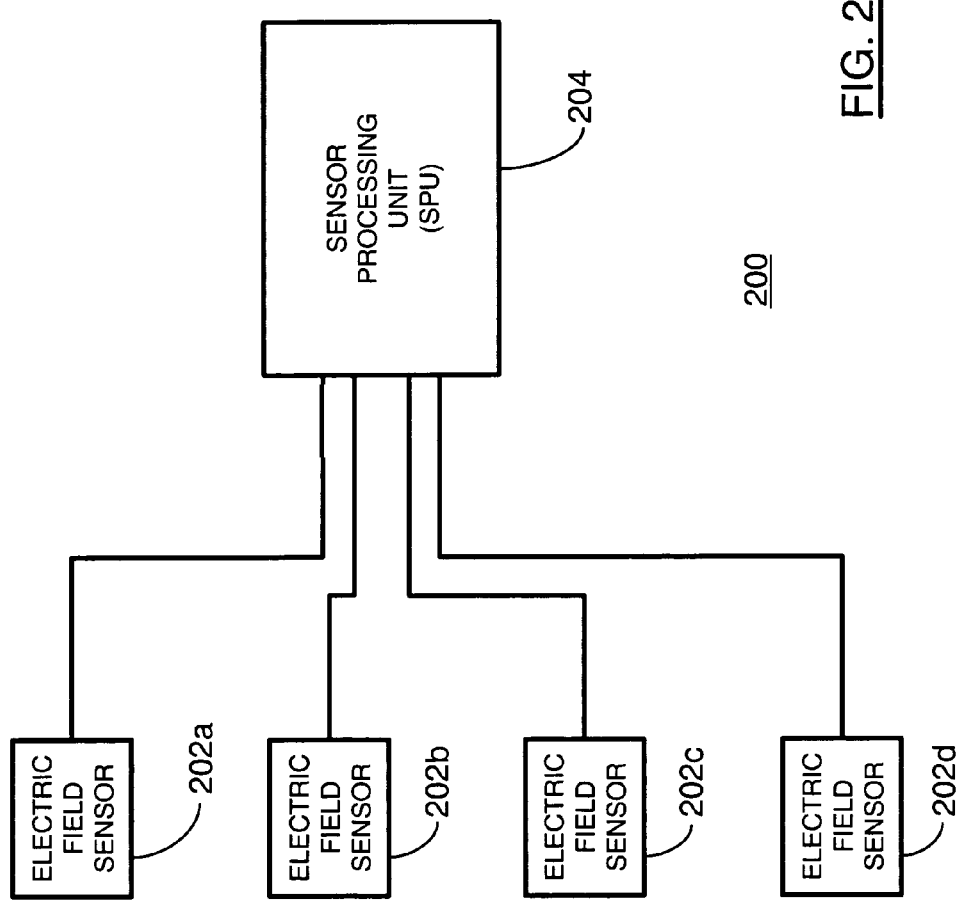

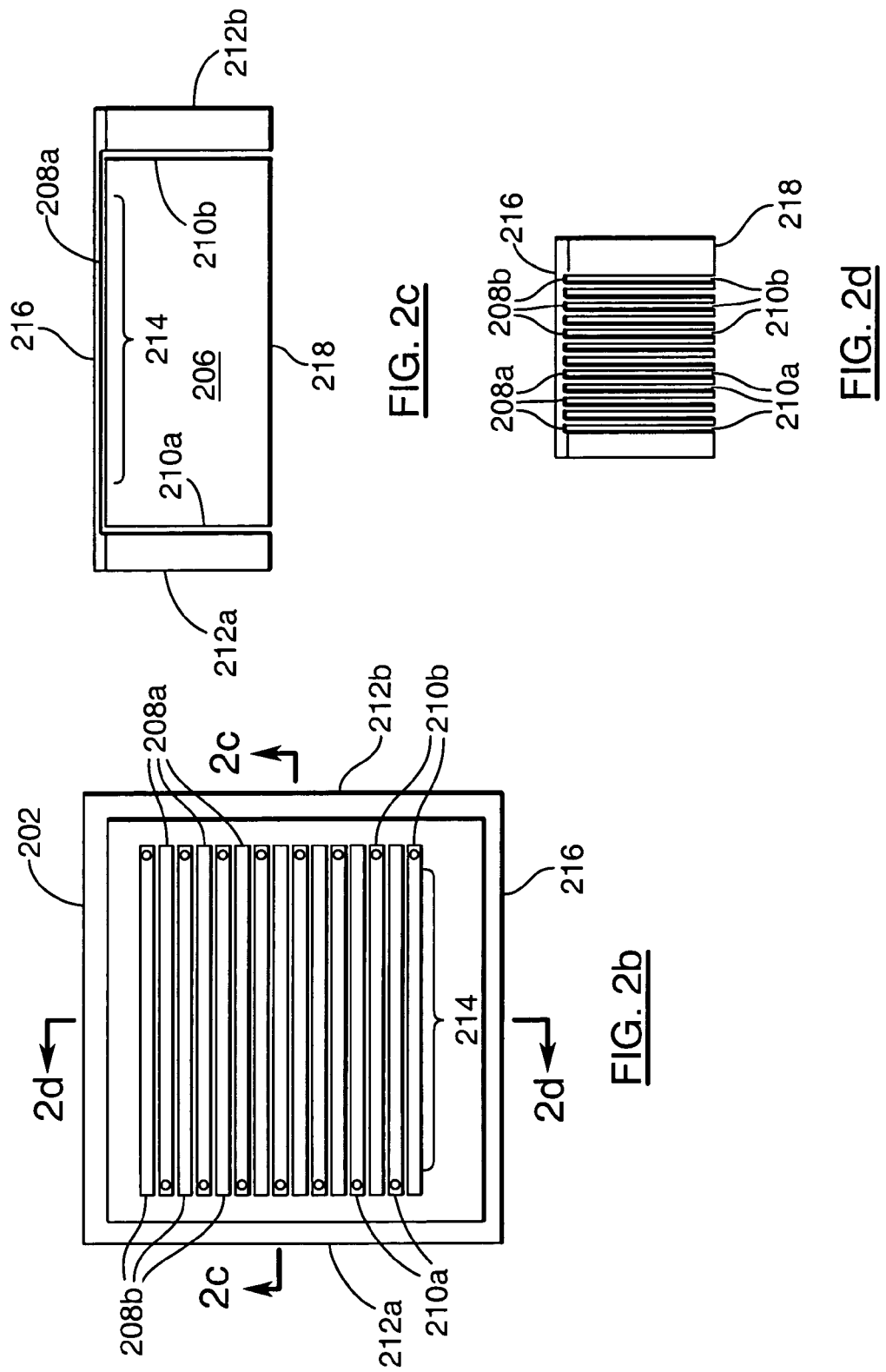

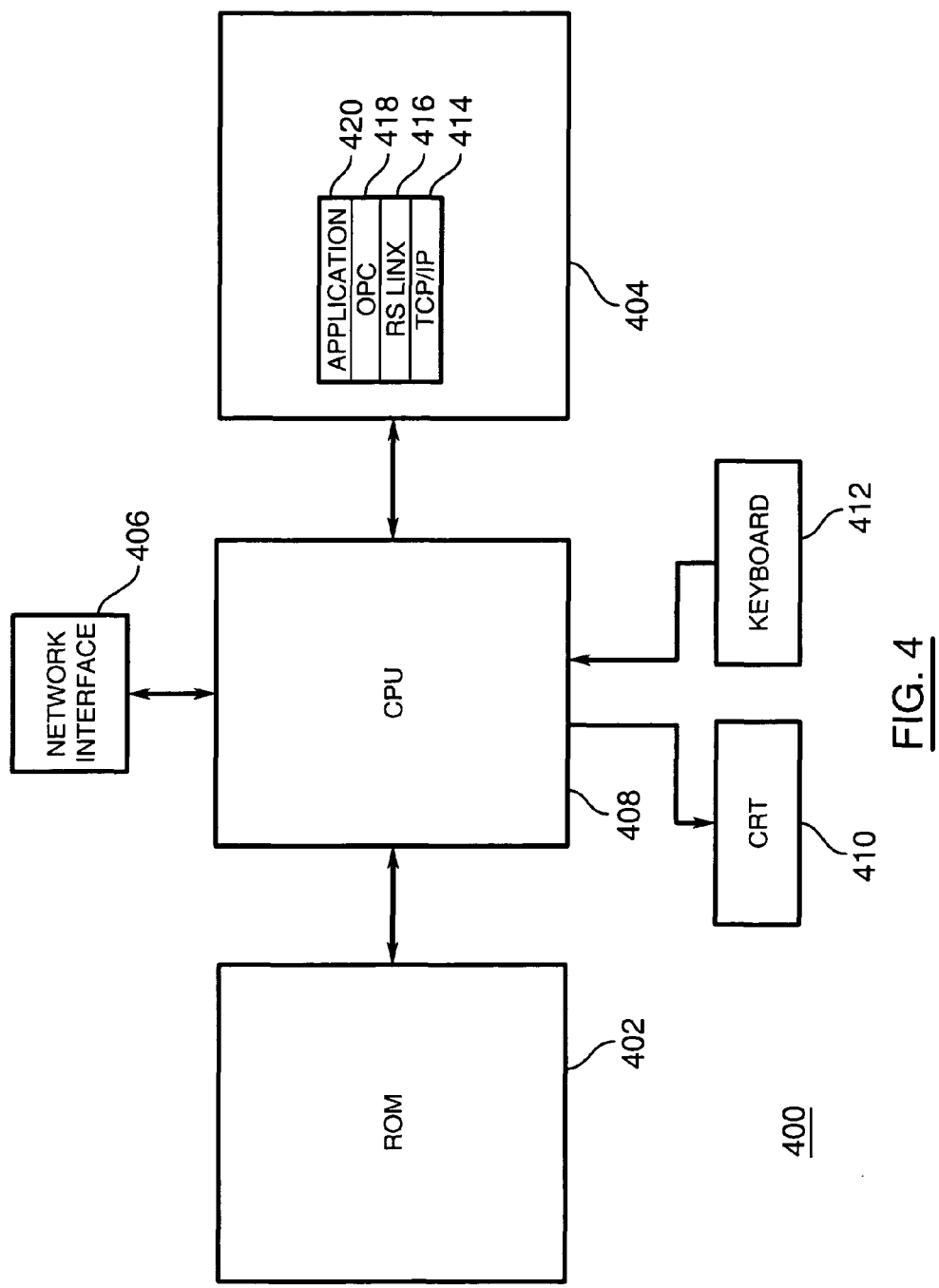

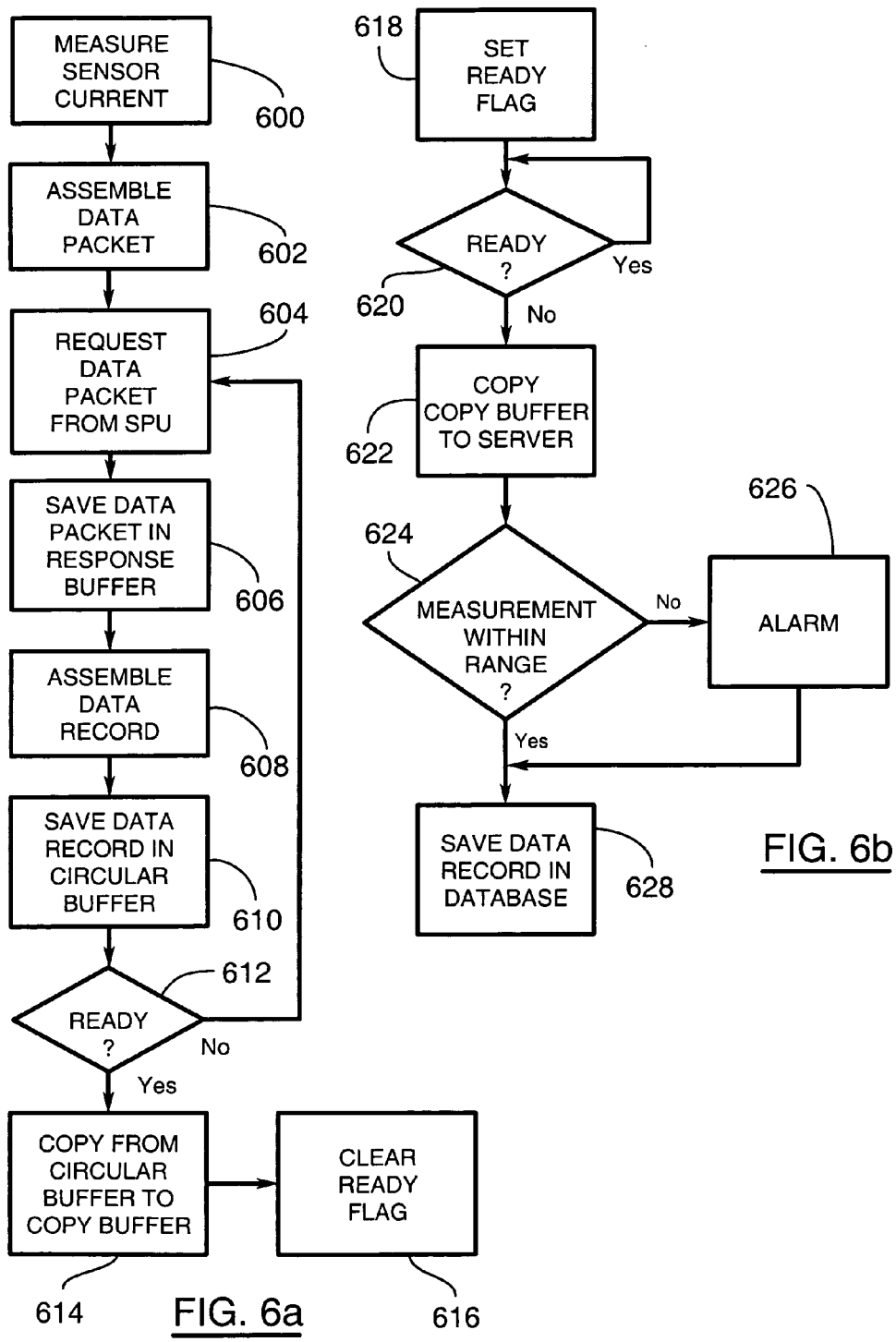

FIBRE MONITORING APPARATUS AND METHOD

FIELD OF THE INVENTION

The present invention relates to a mechanism for monitoring the production of multiple-filament fibre. In particular, the present invention relates to a method and apparatus for monitoring the physical characteristics of multi-filament fibre in real-time.

BACKGROUND OF THE INVENTION

In textile production, synthetic fibres are formed from a "spin-draw" process in which a molten polymer, such as polyester or nylon, is spun into filaments, and twisted together to form a single fibre. The spun fibre is then drawn, altering the fibre's elasticity, tensile strength and diameter. During the process, typically a liquid emulsion or "finish" is applied to the fibre to lubricate the filaments and thereby reduce static electricity generated by the movement of the fibre through processing machinery. Further, interlacing nodes are typically formed in the fibre by exposing the drawn fibre to a pressurized air jet, thereby bonding the individual filaments together at periodic intervals along the fibre.

Lack of uniformity in fibre bulk, finish, denier, or interlacing node distribution can cause fibre entanglement or breakage, or irregularities in fibre coloration during the weaving process, resulting in costly production-line shutdowns for the end-user. Accordingly, attempts have been made to monitor the physical characteristics of fibre in real-time, as it is being produced, to identify defects in the fibre before it is shipped to the end-user.

For instance, Fabbri (U.S. Pat. No. 4,706,014) and Meyer (U.S. Pat. No. 5,394,096) use a capacitive sensor to respectively measure the diameter and denier of a polymer fibre. However, capacitive sensors can only detect large variations in denier. Further, it is not possible to monitor other fibre characteristics of importance to textile users, such as finish, bulk, node count and node quality, using a capacitive sensor.

Sakai (U.S. Pat. No. 4,491,831) uses a phototransistor to detect yarn irregularities. The phototransistor generates an analog signal in response to yarn unevenness. The analog signal is digitized, and then subjected to real-time frequency analysis, to thereby detect both cyclic and non-cyclic yarn irregularities. However, it is not possible to monitor other fibre characteristics of importance to textile users, such as finish, bulk, node count and node quality, using a phototransistor.

Felix (U.S. Pat. No. 4,888,944) monitors a pair of process parameters, such as yarn tension and speed, to detect changes in denier, filament breakage, and absence of finish. However, using the disclosed monitored parameters, it would not be possible to monitor other fibre characteristics of importance to textile users, such as bulk, node count and node quality.

Instrumar Ltd. (CA 2,254,426) uses an electric field sensor for measuring physical fibre characteristics in real-time. Changes in the physical characteristics of a fibre as it is drawn past the sensor causes a current to be induced in the electrode. Comparing the changes in magnitude and phase of the induced current against known fibre profiles allows Instrumar to monitor the denier, finish and interlacing of the drawn fibre in real-time. However, the electrode is sensitive to changes in electric field adjacent to the fibre, thereby reducing the sensitivity of the sensor to the desired fibre characteristics. Further, it is not possible to monitor other fibre characteristics of importance to textile users, such as bulk and node quality, using the described sensor measurements.

Therefore, there remains a need for an improved mechanism for monitoring the physical characteristics of multiple-filament fibre in real-time.

SUMMARY OF THE INVENTION

According to a first aspect of the present invention, there is provided a computer-based fibre production monitoring system comprising at least one sensor, and a computer server in communication with the at least one sensor. The sensor is configured to provide an indication of at least one physical characteristic of a fibre as it is drawn past the sensor on a threadline and wound onto a bobbin. The computer server is configured to provide an analysis of the at least one physical characteristic on a per-threadline (and/or per-bobbin) basis from the indication.

In accordance with one implementation of the invention, the fibre production monitoring system also includes a measurements database for retaining the indications, and the computer server is configured to provide a historical account of the analysis of at least one physical characteristic. The computer server is also configured to compare each indication against a process limit established for the physical characteristic, and to activate an alarm in accordance with a deviation of each indication from the associated process limit. In one variation, the computer server is configured to compare each indication against a respective process limit established for each physical characteristic, and to activate an alarm in accordance with a deviation of at least two of the indications from the associated process limits.

Preferably, the indications comprise periodic measurements of the physical characteristic, and the sensor is configured to locally buffer the measurements taken, and to transmit the buffered measurements to the computer server upon receipt of a data request from the computer server. Further, preferably the sensor comprises an electric field sensor, and a sensor processing unit coupled to the electric field sensor, and the sensor processing unit is configured to provide the at least one measurement by monitoring an amplitude of a current signal induced in the electric field sensor as the fibre is drawn past the electric field sensor.

According to a second aspect of the present invention, the electric field sensor comprises an insulating substrate; a plurality of non-contacting electrodes disposed on the substrate; and a plurality of conductors coupled to the electrodes, and extending transversely through the substrate. Preferably, the electric field sensor also includes an insulator disposed over the electrodes, and the electrodes comprise a first electrode portion and a second electrode portion interlaced with the first electrode portion. The conductors comprise a first conductor portion and a second conductor portion, the first portion of the conductors being coupled to the first electrode portion, the second portion of the conductors being coupled to the second electrode portion. The insulator comprises ceramic or glass, with alumina being the preferred ceramic. Further, the electrodes are disposed parallel to each other on the substrate, and the conductors comprise vias that extend at a right angle to the electrodes.

According to a third aspect of the present invention, there is provided a computer-based method of monitoring the production of fibre involving the steps of: (1) receiving data at a computer server, each said datum being associated with a threadline and including an indication of at least one physical characteristic of a fibre as it is drawn past a sensor on the threadline and wound onto a bobbin; and (2) providing an analysis of the at least one physical characteristic on a per-threadline basis (and/or per bobbin-basis) from the indication.

In accordance with one implementation of the invention, the computer server includes an archive for retaining the indication, and the analysis providing step comprises providing a historical account of the analysis of the at least one physical characteristic. The computer server compares each indication against a process limit established for the physical characteristic; and activates an alarm in accordance with a deviation of each indication from the associated process limit. In one variation, each data packet includes a plurality of the indications, each indication being associated with a respective one of the physical characteristics, and the receiving step comprises the steps of (i) at the computer server, comparing each indication against a respective process limit established for each physical characteristic; and (ii) activating an alarm in accordance with a deviation of at least two of the indications from the associated process limits.

According to a fourth aspect of the present invention, there is provided a computer-based method of monitoring the production of fibre on a threadline, the method comprising the steps of: (1) monitoring an amplitude of a current signal induced in an electric field sensor by a fibre drawn past the sensor; (2) detecting peaks and troughs in the current signal from measurements of the amplitude; and (3) determining a physical property of the fibre from the detected peaks and troughs.

In accordance with one implementation of the invention, the detecting step comprises the steps of (i) identifying local amplitude minimums and maximums from the amplitude measurements; (ii) calculating heights of the local maximums relative to the local minimums; and (iii) excluding those of the local maximums having an associated calculated height less than a predetermined threshold.

Typically, each of the non-excluded local maximums precedes one of the local minimums by a respective time period, and the method also comprises the steps: (iv) excluding those of the non-excluded local maximums having an associated time period greater than a threshold maximum time; (v) excluding those of the non-excluded local maximums having an associated time period less than a threshold minimum time; and (vi) retaining remaining ones of the non-excluded local maximums.

In one variation, the physical property to be determined is node count, and the physical property determining step comprises the steps of: (a) segmenting the amplitude measurements into time spans; and (b) for each said time span, calculating a respective node count from the associated retained local maximums. In another variation, the physical property is node quality, and the physical property determining step comprises for each said time span calculating an average of the associated heights over the associated node count.

According to a fifth aspect of the present invention, there is provided a computer-based method of monitoring the production of fibre on a threadline, the method comprising the steps of: (1) monitoring an output of an electric field sensor disposed on a threadline; (2) detecting the presence of a fibre being drawn past the sensor from an increase in one of an average current, a steady state noise and a node count measured by the electric field sensor; and (3) detecting a break in the fibre from a decrease in the average current, the node count, and a transient noise measured by the electric field sensor, the decreases and the transient noise overlapping in time.

In accordance with one implementation of the invention, the average current is determined by detecting peaks in amplitude of a current induced in the electric field sensor, and calculating an average of the amplitude. The average amplitude is calculated by segmenting the peaks into time spans, and calculating a mean value for an average of the magnitude of the peaks over each said time span. The noise is determined by detecting peaks in amplitude of a current induced in the electric field sensor, segmenting the peaks into time spans, and summing the magnitude of the peaks over each said time span. The node count is determined by detecting peaks in amplitude of a current induced in the electric field sensor, and calculating a node count from the detected peaks. The node count is calculated by segmenting the peaks into time spans, and counting the peaks for each said time span.

According to a sixth aspect of the present invention, there is provided a computer-based method of monitoring the production of fibre on a threadline, the method comprising the steps of: (1) monitoring an output of a plurality of electric field sensors each disposed on a respective one of a plurality of threadlines, each said threadline carrying a multi-filament fibre; and (2) from a change in amplitude of a current signal induced in the electric field sensors as each said fibre is drawn past the respective electric field sensor, detecting the presence of a filament from one of the threadlines in the fibre of another one of the threadlines.

In accordance with one implementation of the invention, the presence of a filament is detected by monitoring for a positive change in the amplitude on the one threadline, and monitoring for a negative change in the amplitude on the other threadline.

BRIEF DESCRIPTION OF THE DRAWINGS

The present invention will now be described, by way of example only, with reference to the accompanying drawings, in which:

FIG. 1 is a schematic view of the computer-based fibre production monitoring system, according to the present invention, depicting the sensors, the sensor monitor, the computer server and the measurements database;

FIG. 2a is a schematic view of one of the sensors (an electric field sensor) depicted in FIG. 1;

FIG. 2b is a top plan view of the electric field sensor depicted in FIG. 2a;

FIGS. 2c and 2d are transverse cross-sectional views of the electric field sensor;

FIG. 4 is a schematic view of the structure of the computer server, depicting the software executed thereon;

FIG. 6 is a flow-chart depicting the method of operation of the fibre production monitoring system in detail, with FIG. 6a depicting the steps performed by the sensor processing unit and the sensor monitor, and with FIG. 6b depicting the steps performed concurrently by the computer server;

DETAILED DESCRIPTION OF THE PREFERRED EMBODIMENT

1. Fibre Production Monitoring System: Overview

Figure 3A:
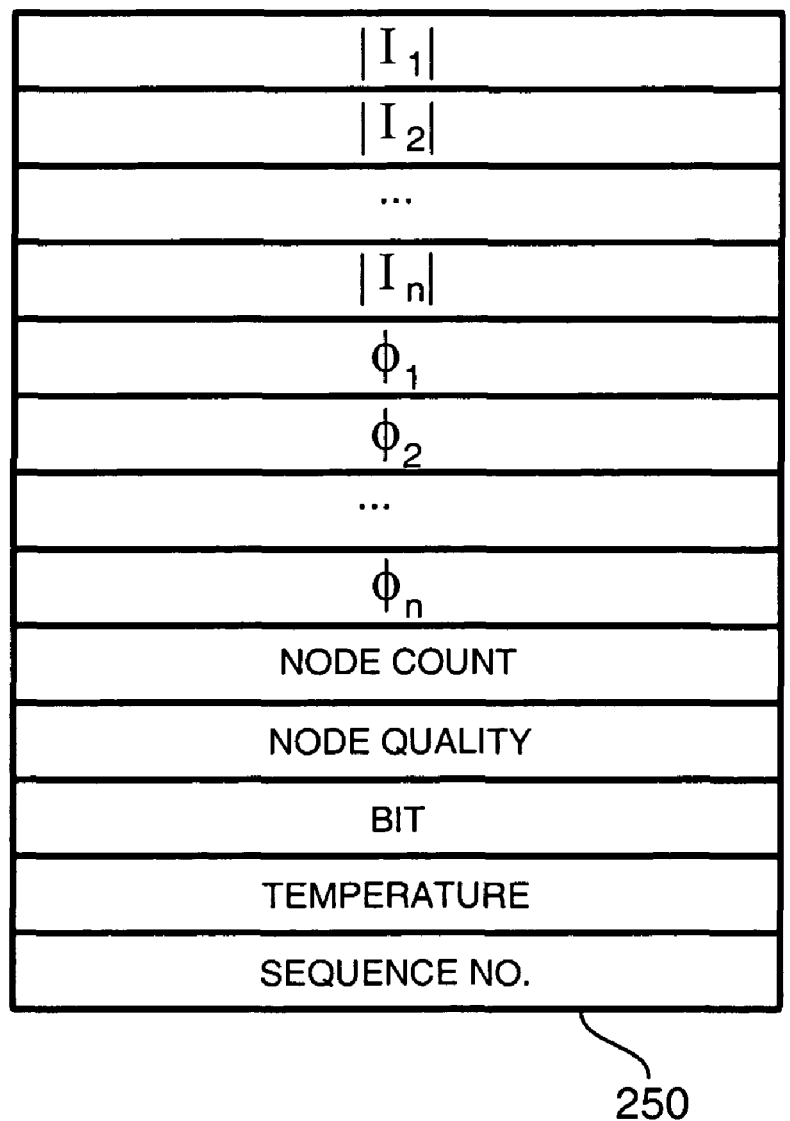
FIG. 3a is a schematic view of the structure of the data packet created by the sensor processing unit.

Turning now to FIG. 1, there is shown a computer-based fibre production monitoring system, denoted generally as 100, comprising a plurality of sensors 200, a sensor monitor 300, a computer server 400, a local area network 102 interconnecting the sensors 200 and the sensor monitor 300, and a communications network 104 interconnecting the sensor monitor 300 and the computer server 400. Optionally, the fibre production monitoring system 100 includes a measurements database 450 resident on the computer server 400; a personal computer 480; and a communications network 110 interconnecting the computer server 400 and the personal computer 480.

Preferably, the local area network 102 comprises a DeviceNet bus, although other network protocols may be used. Preferably the communications network 104 comprises a wired local area Ethernet network. However, the communications network 104 can also utilize other network protocols, and can comprise a wide area network, or a wireless network. Further, although the fibre production monitoring system 100 is shown including a number of sensors 200, the fibre production monitoring system 100 need only include a single sensor 200.

Preferably, the communications 110 is a local area Ethernet network, although the invention is not so limited.

2. Sensor

Each sensor 200 is typically disposed on a threadline of multi-bobbin fibre production line. The multi-bobbin fibre production line has a number of spinnerettes, each producing several filaments from a molten polymer. The filaments are then stretched, and combined into a number of multi-filament fibres. The filaments are also exposed to a continuous air jet, which form interlacing nodes in the fibre, thereby bonding the filaments together in a single fibre. Each fibre is then wound on a respective bobbin.

Each sensor 200 is configured to monitor the physical characteristics of a number of the multi-filament fibres, as the fibres are drawn past the sensor 200, prior to being wound on the bobbin. As shown in FIG. 2a, preferably the sensor 200 comprises a plurality of electric field sensors 202 (depicted as 202a, 202b, 202c, 202d), and a sensor processing unit (SPU) 204 coupled to the electric field sensors 202. Each electric field sensor 202 monitors the physical characteristics of one of the multi-filament fibres. However, as will be appreciated, the sensor 200 need not include several electric field sensors 202, but instead could include only a single electric field sensor 202. Further, although each sensor 202 is preferably an electric field sensor, other forms of sensors that are capable of monitoring the physical characteristics of the fibres can be used.

As shown in FIGS. 2b, 2c and 2d, each electric field sensor 202 comprises an insulating substrate 206, a plurality of electrodes 208 disposed on the substrate 206, and a plurality of vias 210 extending downwardly through the substrate 206. Preferably, the substrate 206 comprises a non-conductive material, such as ceramic, although other non-conductive materials may be used. Also, preferably the electrodes 208 are substantially planar and are formed on the substrate 206 using conventional printed circuit board or integrated circuit manufacturing techniques. The electrodes 208 extend across the top surface of the substrate 206 in a substantially parallel fashion, such that the electrodes 208 do not contact one another on the top surface of the substrate 206.

The electrodes 208 are segregated into a first electrode portion 208a, and a second electrode portion 208b. The electrodes 208 of the first electrode portion 208a extend from one end 212a of the substrate 206, and the electrodes 208 of the second electrode portion 208b extend from the opposite end 212b of the substrate 206. The electrodes 208 of the first electrode portion 208a are interlaced with the electrodes 208 of the second electrode portion 208b in the centre region 214 of the top surface of the substrate 206.

Typically, each via 210 comprises a plated through-hole extending from one end of a respective electrode 208, through the substrate 206, to the bottom 218 of the sensor 202. Alternately, the vias 210 may be provided as conductive traces or wires extending in a similar manner. The vias 210 are segregated into a first via portion 210a, and a second via portion 210b. The vias 210 of the first via portion 210a are coupled to the first electrode portion 208a, and the vias 210 of the second via portion 210b are coupled to the second electrode portion 208b. Each via 210 is connected to a respective electrode 208 adjacent the respective end 212, and extends at a right angle from the electrode 208 through the substrate 206, from the top surface thereof to the bottom surface 218 thereof. With this configuration, the sensitivity of the electric field sensor 202 to electric fields outside the centre region 214 is less than prior art electric field sensors.

The electric field sensor 202 preferably also includes an insulator layer 216 disposed over the electrodes 208. Typically, the insulator layer 216 comprises ceramic or glass, although the ceramic alumina is preferred due to its hardness. Preferably, the electric field sensor 202 includes guides (not shown) extending upwards from the insulator layer 216, within the centre region 214, which guide the drawn fibre in a direction transverse to the orientation to the electrodes 208.

The sensor processing unit (SPU) 204 includes a number of data buses, each connected to the vias 210 of a respective one of the electric field sensors 202. Each via 210 connects to a respective conductor of the data buses at the bottom 216 of the sensor 202. The SPU 204 applies a respective sinusoidal voltage signal to the electrode portions 208, with the voltage signal applied to the first electrode portion 208a being complementary (ie 180 degrees out of phase) to the voltage signal applied to the second electrode portion 208b. The SPU 204 also monitors the current induced in each electric field sensor 202, as the associated fibres are drawn past the electric field sensors 202. The SPU 204 includes an internal A/D converter that periodically digitizes the current measurements from the associated electric field sensors 202. Based on the current measurements, the SPU 204 creates a data packet 250 (see FIG. 3a) that includes a series of measurements of physical characteristics of the fibre as it is drawn past the electric field sensor 202.

As shown in FIG. 3a, each data packet 250 includes a series of magnitude measurements and a series of phase measurements, measured over a predetermined measurement time span. The SPU 204 derives the magnitude and phase measurements by referencing the magnitude and phase of the current induced in the sensor 202 respectively to the magnitude and phase of the applied sensor voltage. In effect, then, the magnitude measurements included with each data packet 250 are admittance measurements. However, for ease of reference, the magnitude (admittance) measurements included with each data packet 250 will be referred to hereinafter as current magnitude measurements; and the phase measurements included with each data packet 250 will be referred to hereinafter as current phase measurements.

In addition to the magnitude measurements and the phase measurements, each data packet 250 includes a node count of the number interlacing nodes encountered by the associated electric field sensor 202 within the measurement time span, and a measurement of the node quality of those nodes. The data packet 250 also includes a Built-In-Test (BIT) datum that identifies the status of the SPU 204. Further, as discussed above, preferably the insulator layer 216 of the electric field sensor 202 comprises alumina. However, since alumina increases the sensitivity of the electric field sensor 202 to temperature, preferably the data packet 250 also includes a measure of the temperature of the electric field sensor 202. In addition, the data packet 250 includes a sequence number that is generated by the SPU 204.

3. Sensor Monitor

The sensor monitor 300 is coupled to the sensor processing units 204 of the sensors 200 via the DeviceNet bus 102. Preferably, the sensor monitor 300 comprises a programmable logic controller (PLC), such as the Allan Bradley Control Logix PLC. Further, preferably the sensor monitor 300 includes a DeviceNet scanner that periodically sends out commands to the sensor processing units 204, requesting data packets 250 from the sensors 200. As will be explained, the sensors 200 provide the sensor monitor 300 with the data packets 250 for the associated threadlines, which the sensor monitor 300 converts into data records 350 (see FIG. 3*b*) and transmits to the computer server 400 over the communications network 104. The DeviceNet scanner includes a response buffer 302 (FIG. 1) that is used to store the data packets 250 prior to being converted into the data records 350.

Each sensor processing unit 204 is assigned a respective DeviceNet address, so that each electric field sensor 202 has a unique logical sensor address which the sensor monitor 300 uses to identify the threadline for the data packets 250 received from the sensors 200. Preferably, the sensor processing unit 204 low pass filters the induced current at a cut-off frequency of 15 kHz, and provides the sensor monitor 300 with the resulting data packets 250 every 200 ms. Other data rates could be used. Further, preferably the DeviceNet scanner sends out data request commands to the sensors 200 at rate slightly faster than once every 200 ms to ensure that data from the sensors 200 is not overwritten (and lost) at the sensor processing unit 204 prior to being transmitted to the sensor monitor 300.

To avoid loss of data at the sensor monitor 300, preferably the sensor monitor 300 includes a circular buffer 304 (FIG. 1) for retaining the data records 350 until transmitted to the computer server 400. Further, the sensor monitor 300 includes a copy buffer 306 (FIG. 1) which the computer server 400 uses to copy data from the sensor monitor 300, and a Ready flag 308 (FIG. 1) which the computer server 400 uses to signify that it is ready to receive data records 350 from the copy buffer 306.

In addition, the sensor monitor 300 includes a first sliding window 310, a second sliding window 312, and a noise monitor 314 (FIG. 1). The first and second sliding windows 310 each comprise a 25-slot queue that the thread presence algorithm uses to detect the presence of a fibre on a threadline, and line breaks in the fibre. The noise monitor 314 comprises a 50-element queue that the thread presence algorithm also uses to detect the presence of a fibre on a threadline, and line breaks in the fibre.

4. Data Record

Figure 3B:
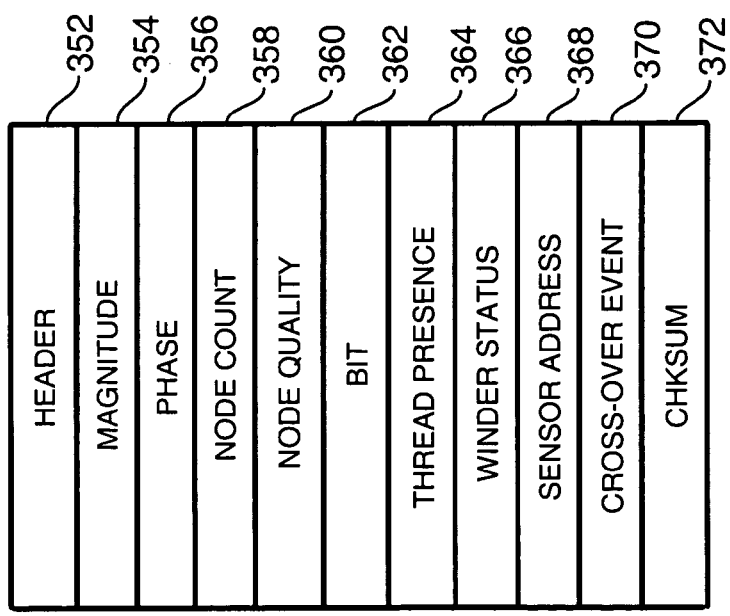
FIG. 3b is a schematic view of the structure of the data record created by the sensor monitor.

As shown in FIG. 3*b*, the data record 350 includes an initial header 352, a magnitude field 354, a phase field 356, a node count field 358, a node quality field 360, a BIT field 362, a thread presence flag 364, a winder status field 366, a sensor address field 368, a cross-over event field 370 and a checksum field 372. The initial header 352 identifies the type of data contained in the data record 350. For instance, the data header 352 might indicate that the data record 350 includes normal sensor data. Alternately, the data header 352 might indicate that the data record 350 includes data specifically requested by the sensor monitor 300, such as the temperature of the electric field sensor 202.

The magnitude field 354 provides a measure of the amplitude of the current induced in the electric field sensor 202. The phase field 356 provides a measure of the phase of the current induced in the electric field sensor 202, relative to a reference signal (such as the voltage applied to the electric field sensor 202). The node count field 358 provides a measure of the number of interlacing nodes detected within a predetermined length of fibre. The node quality field 360 provides a measure of the average amplitude. The BIT (Built-in-Test) field 362 provides an indication of the status of the electric field sensor 202. For instance, typically the BIT field 362 is a two-byte datum that indicates whether the temperature of the electric field sensor 202 is out of range, and whether the data measured by the internal A/D converter of the sensor processing unit 204 is out of range.

The thread presence flag 364 provides an indication of the presence or absence of a fibre at the electric field sensor 202. The thread presence flag 364 may be set using a suitable sensor disposed on the threadline, that is monitored by the sensor monitor 300. Alternately, the thread presence flag 364 may be set using the threadline presence algorithm, described herein.

The winder status field 366 provides an indication of the status of the bobbin winder, such as whether fiber is going to package or not. Each winder includes test circuitry that monitors the status of the respective winder. The sensor monitor 300 monitors the test circuitry in each winder, and sets the winder status field 366 accordingly.

The sensor address field 368 identifies the logical address of the electric field sensor 202 from which the associated data in the data record 350 originated. The cross-over event field 370 provides an indication that one or more filaments from the fibre on one threadline has/have jumped or crossed over to the fibre on another threadline. The checksum field 372 includes a checksum, which is generated by the sensor monitor 300, and used by the computer server 400 to verify the integrity of the data record 350.

5. Computer Server

As shown in FIG. 4, the computer server 400 comprises a non-volatile memory (ROM) 402, a volatile memory (RAM) 404, a network interface 406, and a central processing unit (CPU) 408 coupled to the ROM 402, the RAM 404, and the network interface 406. The computer server 400 also includes a display device 410 (such as a CRT or LCD panel), and a data input device 412 (such as a keyboard) coupled to the CPU 408.

The network interface 406 interfaces the computer server 400 with the communications network 104, and allows the computer server 400 to communicate with the sensor monitor 300. The ROM 402 may be provided as an electronic memory, a magnetic disc and/or an optical disc. The ROM 402 includes processing instructions for the computer server 400 which, when loaded into the RAM 404, define a TCP/IP layer 414, a RS Linx layer 416, an OPC layer 418, and an application software layer 420. Alternately, the processing instructions may be provided via the network interface 104 or a removable computer-readable medium, which, when accessed by the CPU 408 define in the RAM 404 one or more of the TCP/IP layer 414, the RS Linx layer 416, the OPC layer 418, and the application software layer 420.

The TCP/IP layer 414 establishes a communications channel between the sensor monitor 300 and the computer server 400 over the communications network 104. The RS Linx layer 416 is in communication with the TCP/IP layer 414, and implements the OPC groups required to communicate with the sensor monitor 300.

The OPC layer 418 is in communication with the RS Linx layer 416, and defines the OPC groups that allow the computer server 400 to retrieve the data records 350 from the sensor monitor 300. The application software layer 420 is in communication with the OPC layer 418, and stores the retrieved data records 350 in the measurements database 450. In addition, the application software layer 420 also provides users with an analysis of the physical characteristics of the fibre(s) from the retained data records 350. For instance, the application software layer 420 provides an analysis of the denier (mass flow of fibre, expressed in grams per 9000 metres of fibre), spin finish (residual solvent or coating on the fibre), bulk (the degree of texturing due to crimp and shrinkage) and evenness (variation in denier) of the fibre(s).

Since slow variations (typically less than 5 Hz) in the peak magnitude of the sensor current are due primarily to changes in denier or bulk, the application software layer 420 provides an analysis of the denier or bulk by reporting low frequency changes in the peak magnitude of the sensor current. Since slow variations (typically less than 5 Hz) in the phase of the sensor current are due primarily to changes in spin finish, the application software layer 420 provides an analysis of the finish applied to the fibres by reporting low frequency changes in the phase of the sensor current.

As will be explained, the waveform of the current induced in the electric field sensors 202a consists of a series of peaks and troughs. Since the size of the variations in the peaks of the sensor current measurements is a good indicator of evenness, the application software layer 420 provides an analysis of evenness by calculating the coefficient of variation of the current magnitudes at the peaks.

In addition to denier, finish, bulk and evenness, preferably the application software layer 420 also provides an analysis of the node count (number of interlacing nodes detected per sample period) and node quality (measure of the compactness of the interlacing nodes) of the fibre(s). Further, the application software layer 420 may provide an analysis of the number of line breaks and cross-over events for the fibre(s). The mechanism by which these latter characteristics are determined will be discussed below with reference to FIGS. 5 to 9.

As described above, the sensor monitor 300 preferably comprises a programmable logic controller, that receives the data packets 250 from the sensors 200, and converts into data records 350. However, in one variation, the sensor monitor 300 comprises an Ethernet-DeviceNet Adaptor that serves a data conduit between the computer server 400 and the sensor processing units 204. In this variation, the Ethernet-DeviceNet Adaptor does not perform any data manipulation, but instead transmits the data packets 250 received from the sensors 200 to the computer server 400. Further, the RS Linx layer 416 and the OPC layer 418 are eliminated from the computer server 400; and the first and second sliding windows 310, 312 and the noise monitor 314 are implemented by the computer server 400 instead of the sensor monitor 300.

6. Measurements Database

As shown, preferably the measurements database 450 is provided on the computer server 400. However, the measurements database 450 may also be maintained on a separate SQL or ORACLE server that is in communication with the computer server 400.

Typically, each bobbin has a bobbin identifier, such as a bar code, marked thereon, that is uniquely associated with the bobbin. When an operator of the fibre production monitoring system 100 loads an empty bobbin onto one of the bobbin winders, the operator inputs the bobbin identifier into the application software layer 420 of the computer server 400, either through a keyboard or code reader device. The application software layer 420 maintains a record associating the bobbin identifier with the sensor address(es) 368 of the sensor(s) 200 of the threadline upon which the bobbin will be wound.

The application software layer 420 is configured to save the bobbin identifier in the measurements database 450, together with the associated data records 350. As such, the application software layer 420 is able to provide an analysis of each of the foregoing parameters (denier, finish, bulk, evenness, node count, node quality, cross-over events) on a per-bobbin basis, thereby allowing the operator to verify the quality of each bobbin produced. The application software layer 420 is also able to provide an analysis of each of the foregoing parameters on a per-threadline basis. The application software layer 420 can also generate a hardcopy of the analysis, which can accompany the respective bobbin, thereby allowing the purchaser to verify the quality of the bobbin. Further, since the data records 350 and the associated bobbin identifiers are stored in the measurements database 450, the application software layer 420 is able to provide a historical analysis of each of the foregoing characteristics, on a per-threadline basis to thereby identify possibly failing hardware, and/or on a per-bobbin basis to accompany a shipment of bobbins.

7. Personal Computer

The personal computer 480 may be implemented as a portable computer or a desktop computer, or even as a handheld communications device, such as a wireless portable data assistant. As discussed above, the personal computer 480 communicates with the computer server 400 over the communications network 110 Typically, the personal computer 480 is used to render the results of the foregoing forms of analysis. Further, the personal computer 480 may be used to control the operation of the fibre production monitoring system 100 via the computer server 400.

8. Fibre Production Monitoring System: Method of Operation

Figure 5:
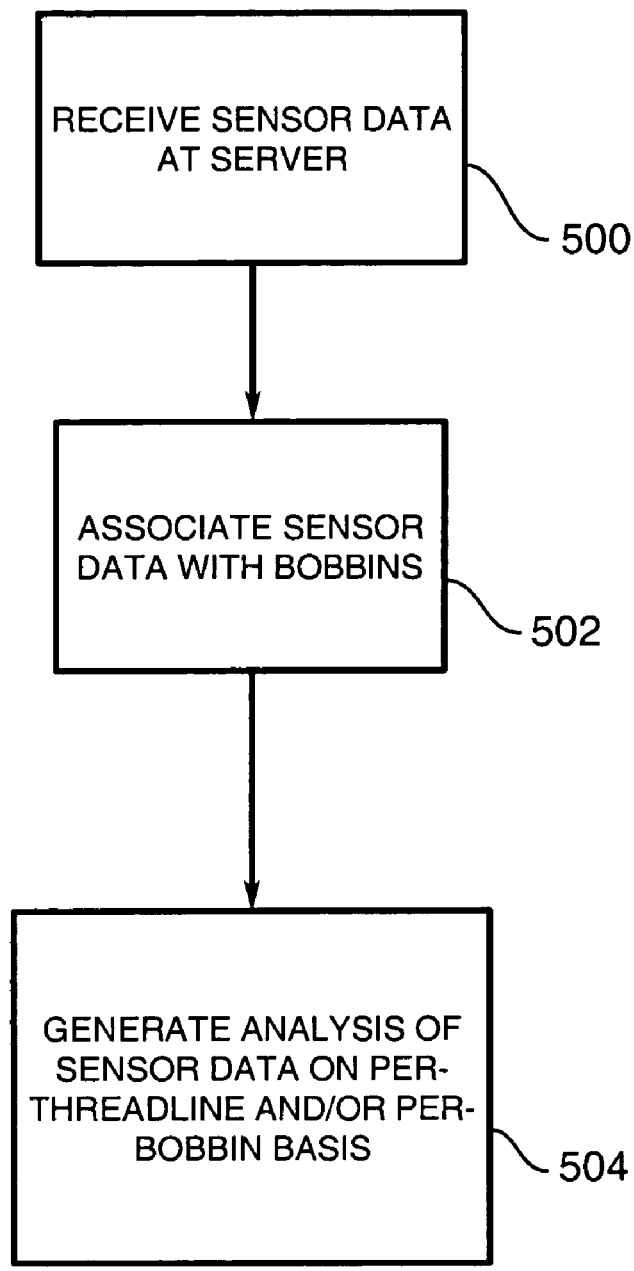
FIG. 5 is a flow-chart depicting generally the method of operation of the fibre production monitoring system.

The method of operation of the fibre production monitoring system 100 will now be described generally with reference to FIG. 5, followed by a more detailed discussion with reference to FIG. 6. Thereafter, the node count and node quality algorithms will be described with reference to FIGS. 7a and 7b. The thread presence algorithm; and the cross-over events detection algorithm will then be described with reference to FIGS. 8 and 9, respectively.

At step 500, the computer server 400 receives from the sensor(s) 200, the data records 350 over the communications network 104. The data records 350 include at least one measurement of a physical characteristic of a fibre as it is drawn past one of the sensors 200. The data records 350 include the sensor addresses 368, thereby identifying the threadline to which the data record 350 pertains. At step 502, the computer server 400 associates the sensor addresses 368 with the corresponding bobbin identifiers. Preferably, the computer server 400 also saves the received data records 350 (and the associated bobbin identifiers) in the measurements database 450.

Thereafter, at step 504, in response to a request issued by an operator of the personal computer 480, the computer server 400 generates an analysis of the data records 350 (either stored in the RAM 404 of the computer server 400, or in the measurements database 450). Typically, the computer server 400 generates an analysis of the denier, finish, bulk and/or evenness of the fibre(s). The computer server 400 may also provide an analysis of the node count and/or node quality of the fibre(s). Further, the computer server 400 may provide an analysis of the number of line breaks and/or cross-over events for the fibre(s). Preferably, the analysis is rendered on the personal computer 480, on a per-threadline and/or a per-bobbin basis. In other words, the computer server 400 provides an analysis of one or more of the foregoing characteristics for one or more specified threadlines, and/or one or more specified bobbins. The computer server 400 may provide a historical analysis of one or more of the foregoing characteristics, for example over a specified period of time on one or more specified threadlines.

Further details of the foregoing method will now be described with reference to FIG. 6. In the foregoing discussion, it should be understood that steps 600 to 616 are performed by the sensor processing unit 204 and the sensor monitor 300, and steps 618 to 628 are performed by the computer server 400. Also, steps 600 to 616 are performed concurrently with steps 618 to 628. Further, steps 600 to 616 and steps 618 to 628 are performed repeatedly.

At step 600, the sensor processing units 204 apply the aforementioned complementary sinusoidal voltage signals to the associated electric field sensor(s) 202, and continuously measure the current induced in the associated electric field sensor(s) 202 as the fibre is drawn past the electric field sensor(s) 202. Each sensor processing unit 204 measures the induced current over a predetermined measurement time span, which is typically 200 ms.

At the end of each time span, each sensor processing unit 204 assembles a data packet 250 from the measured currents, at step 602. The data packet 250 includes the series of current magnitude measurements and the series of current phase measurements, measured over the measurement time span. As discussed above, the magnitude and phase measurements included with the data packet 250 are referenced respectively to the magnitude and phase of the applied sensor voltage. Thus, the magnitude measurements included with the data packet 250 are admittance measurements.

In addition to the current magnitude measurements and the current phase measurements, each data packet 250 includes a count of the number interlacing nodes encountered by the associated electric field sensor 202 within the measurement time span, and a measurement of the quality of those nodes. The node count and node quality algorithms will be described in detail with reference to FIG. 7.

Each data packet 250 also includes a sequence number, and a BIT datum that identifies the status of the sensor processing unit 204. Preferably, each data packet 250 also includes a measure of the temperature of the associated electric field sensor 202. As discussed above, preferably each sensor processing unit 204 low pass filters the current(s) at each electric field sensor 202 a cut-off frequency of 15 kHz, and assembles the sensed data stream into data packets every 200 ms. Each sensor processing unit 204 continuously performs steps 600 and 602.

At step 604, the DeviceNet scanner of the sensor monitor 300 transmits read commands to the sensor processing units 204, requesting the data packets 250 from the sensor processing units 204. As discussed above, the DeviceNet scanner sends out the read commands to the sensor processing unit 204 at rate slightly faster than once every 200 ms to ensure that data from the sensors 200 is not overwritten (and lost) at the sensor processing unit 204 prior to being transmitted to the sensor monitor 300. At step 606, the DeviceNet scanner receives a data packet 250 from the sensor processing unit 204, and stores the received data packet 250 into the memory of the response buffer 302 based on the logical sensor address of the sensor 200 from which the data packet 250 was generated.

As discussed above, the data packet 250 includes a series of current magnitude and phase measurements, a node count, and a measurement of the node quality of those nodes. Further, the data packet 250 also includes a BIT datum that identifies the status of the sensor processing unit 204, a measure of the temperature of the electric field sensor 202, and a sequence number generated by the sensor processing unit 204.

The sensor monitor 300 monitors the status of the response buffer 302, and detects the presence of new data from changes in the sequence number. When the sensor monitor 300 detects the presence of a new data packet 250 in the response buffer 302, the sensor monitor 300 removes the data packet 250 from the response buffer 302, and creates a data record 350 from the removed data packet 250, at step 608. As discussed above, the data record 350 includes an initial header 352, a magnitude field 354, a phase field 356, a node count field 358, a node quality field 360, a BIT field 362, a thread presence flag 364, a winder status field 366, a sensor address field 368, a cross-over event field 370 and a checksum field 372.

At step 610, the sensor monitor 300 stores the data record 350 into the next available entry in the circular buffer 304. Further, the sensor monitor 300 inserts the sequence number (from the corresponding data packet 250) at the beginning and end of the data record 350 to allow the sensor monitor 300 to subsequently identify the beginning and end of the data record 350.

The OPC layer 418 signals the sensor monitor 300 that the computer server 400 is ready to receive data records 350 by setting the Ready flag 308 in the sensor monitor 300 (at step 618), via the RS Linx layer 416. Consequently, at step 612, the sensor monitor 300 monitors the status of the Ready flag 308. If the Ready flag 308 is clear, the sensor monitor 300 performs steps 604 to 610 again. However, if the Ready flag 308 is set, at step 614 the sensor monitor 300 copies the contents of the circular buffer 304 into the copy buffer 306. The sensor monitor 300 then clears the Ready flag 308, at step 616.

As discussed above, the OPC layer 418 signals the sensor monitor 300 that the computer server 400 is ready to receive data records 350 by setting the Ready flag 308 in the sensor monitor 300, at step 618. Consequently, the OPC layer 418 monitors the status of the Ready flag 308, at step 620 (to determine if the Ready flag 308 has been cleared by the sensor monitor 300 at step 616). If the OPC layer 418 detects that the Ready flag 308 has now been cleared, the RS Linx layer 416 copies the data records 350 in the copy buffer 306 to a buffer in the computer server 400, at step 622.

Typically, the operator of the fibre production monitoring system 100 will input into the application software layer 420 one or more parameter limits for any of the foregoing physical parameters (denier, finish, bulk, evenness, node count, node quality, line breaks, cross-over events) using the data input device 412. For instance, the operator may establish an upper process limit (UP), and a lower process limit (LP) for one or more of these parameters. The operator may establish may also establish an upper control limit (UC), and a lower control limit (LC) for one or more of these parameters. The UP and LP limits respectively define absolute upper and lower limits for the associated parameters. The UC and LC limits respectively define desired upper and lower limits for the associated parameters.

Accordingly, upon receipt of the data records 350, the application software layer 420 compares the measurements contained therein against the defined parameter limits, at step 624. If one of the measurements deviates from the range established by the defined parameter limits, at step 626 the application software layer 420 activates an audible and/or visual alarm on the computer server 400. Typically, the application software layer 420 renders a yellow warning light on the display device 410 if one of the measurements deviates outside the range bound by UC and LC, and renders a red warning light on the display device 410 if one of the measurements deviates outside the range bound by UP and LP.

In one variation, instead of activating an alarm when one of the measurements deviates from the range established by the defined parameter limits, the application software layer 420 activates an alarm at step 626 when two or more different characteristics of measurements deviate from the respective ranges established by the defined parameter limits. This variation is advantageous if one of the characteristic measurements alone is an insufficient indicator of the desired physical parameter. For instance, typically the magnitude of the induced current is a good indicator of denier, and the phase of the induced current is a good indicator of finish. However, with some fibres, current magnitude may not correlate well with denier, and current phase may not correlate well with finish. Accordingly, to provide a reliable indictor of denier, for example, it may be preferable to monitor both magnitude and phase; or magnitude, phase and node quality; or magnitude, phase and node quality, for example, and activate an alarm when the specified parameters exceed or fall below the associated parameter limits.

Furthermore, in another variation, the application software layer 420 activates an alarm at step 626 based on the number of characteristic measurements deviating from the respective ranges defined by the parameter limits, and the direction of the deviation. For instance, it may be advantageous to trigger an alarm at step 626 when one of the characteristic measurements exceeds an upper process limit (UP or UC), and another one of the characteristic measurements falls below a lower process limit (LP or LC). Other variations on the foregoing will be apparent.

As discussed above, each data record 350 includes the sensor address 368 of the sensor 200 from which the data originated. Further, the application software layer 420 maintains a record associating each bobbin identifier with the sensor address(es) 368 of the sensor(s) 200 of the threadline upon which each bobbin will be wound. Accordingly, at step 628, the application software layer 420 saves the data records 350 (and the associated bobbin identifiers) in the measurements database 450.

Before the data records 350 are being stored in the measurements database 450 (or at some time after they are stored), the application software layer 420 generates an analysis of the denier of the fibre being wound on one or more of the bobbins. Typically, the average value of the magnitude of the current induced in the electric field sensor 202 is a good indicator of denier, and the average value of the phase of the current induced in the electric field sensor 202 is a good indicator of finish. However, as will be explained with reference to FIG. 7a, the waveform of the current induced in the electric field sensors 202a consists of a series of local maxima (peaks) and local minima (troughs). Accordingly, preferably the computer server 400 provides an analysis of the denier by calculating the average value of the current magnitude at the peaks. Similarly, preferably the computer server 400 provides an analysis of the finish by calculating the average value of the current phase at the peaks.

Typically, the variation of the magnitude of the current magnitudes at the peaks is also a good indicator of evenness. Accordingly, preferably the computer server 400 provides an analysis of evenness by calculating the coefficient of variation of the current magnitudes at the peaks.

9. Node Count and Node Quality Algorithms

Figure 7A:
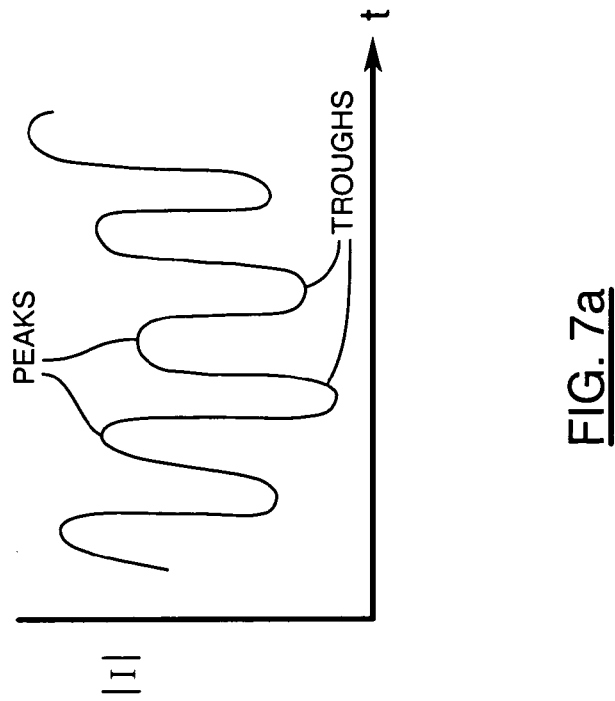
FIG. 7a is a waveform depicting the variation in the magnitude of the induced current with respect to interlacing node location.

The node count and node quality algorithms will now be described with reference to FIGS. 7a and 7b. As shown in FIG. 7a, the magnitude of the current induced in the electric field sensor 202 varies periodically with time as the fibre is drawn past the electric field sensor 202. The resulting current waveform consists of a series of cyclic current variations comprising a series of local maxima (peaks) and a series of local minima (troughs). Each cyclic current variation is caused by the movement of an interlacing node past the electric field sensor 202.

The sensor processing unit 204 monitors the current magnitude, and detects the peaks and the troughs in the induced current. From the peaks and the troughs, the sensor processing unit 204 determines a physical property of the fibre based on the timing and magnitude of the peaks and troughs.

Figure 7B:
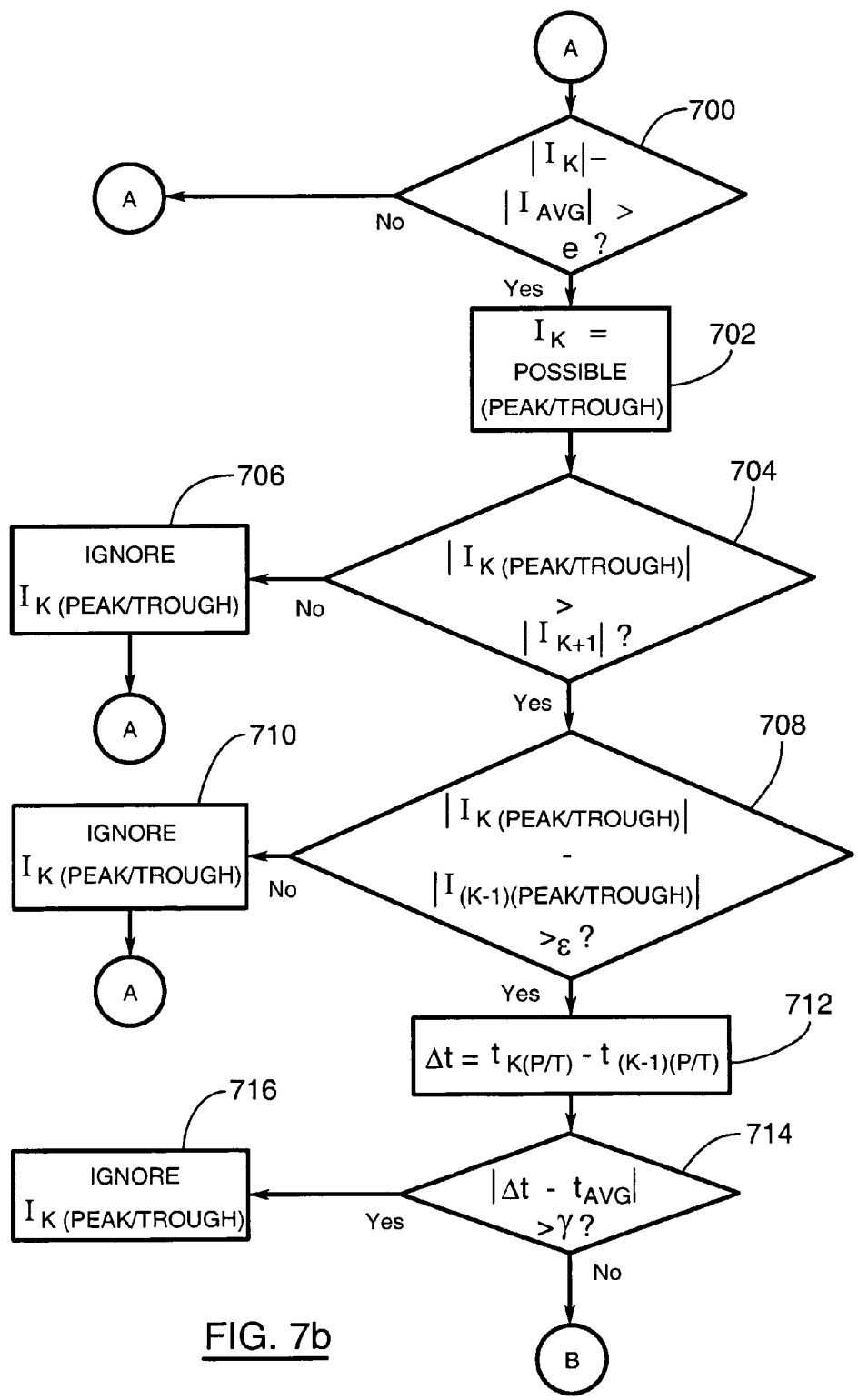
FIGS. 7b and 7c together comprise a flow-chart depicting the method of determining node count and node quality with the fibre production monitoring system.
Figure 7C:
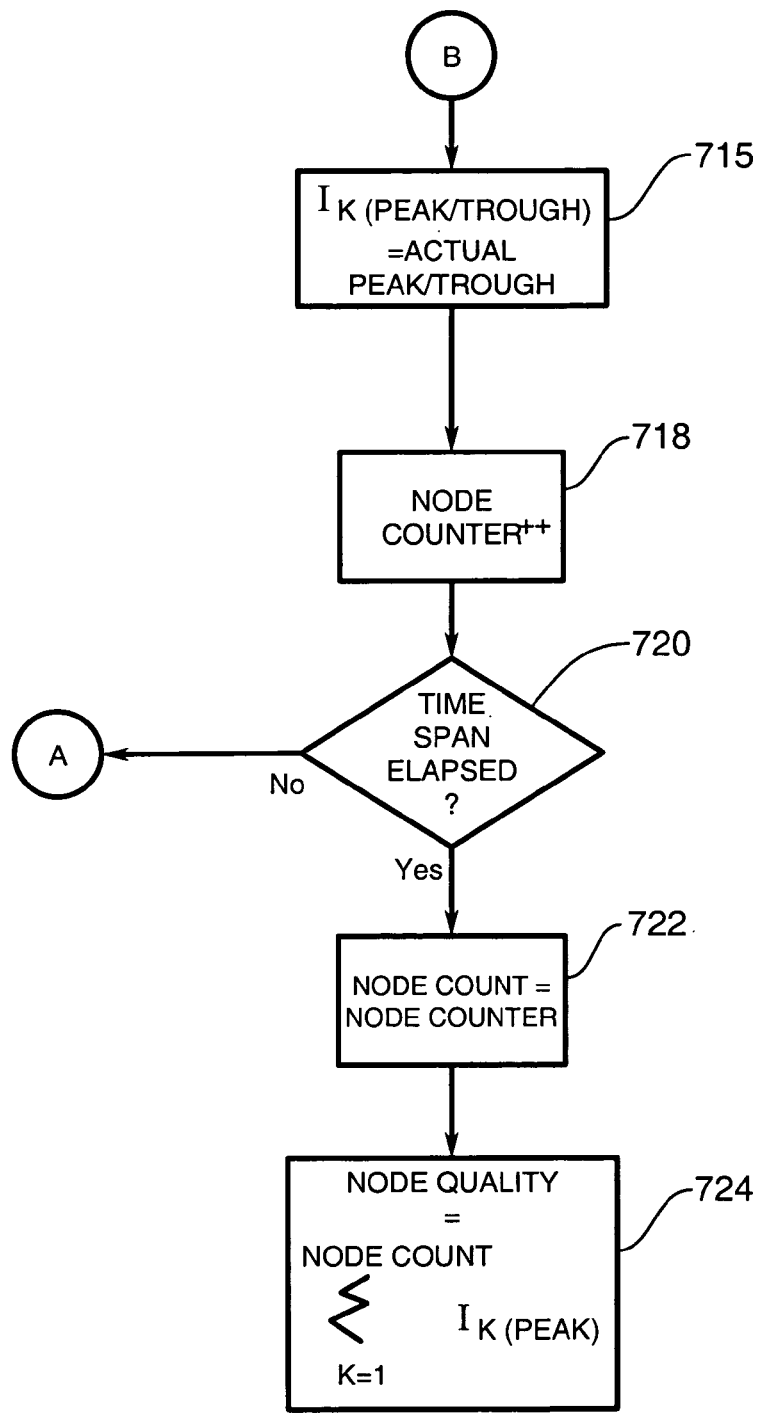
Figure 8A:
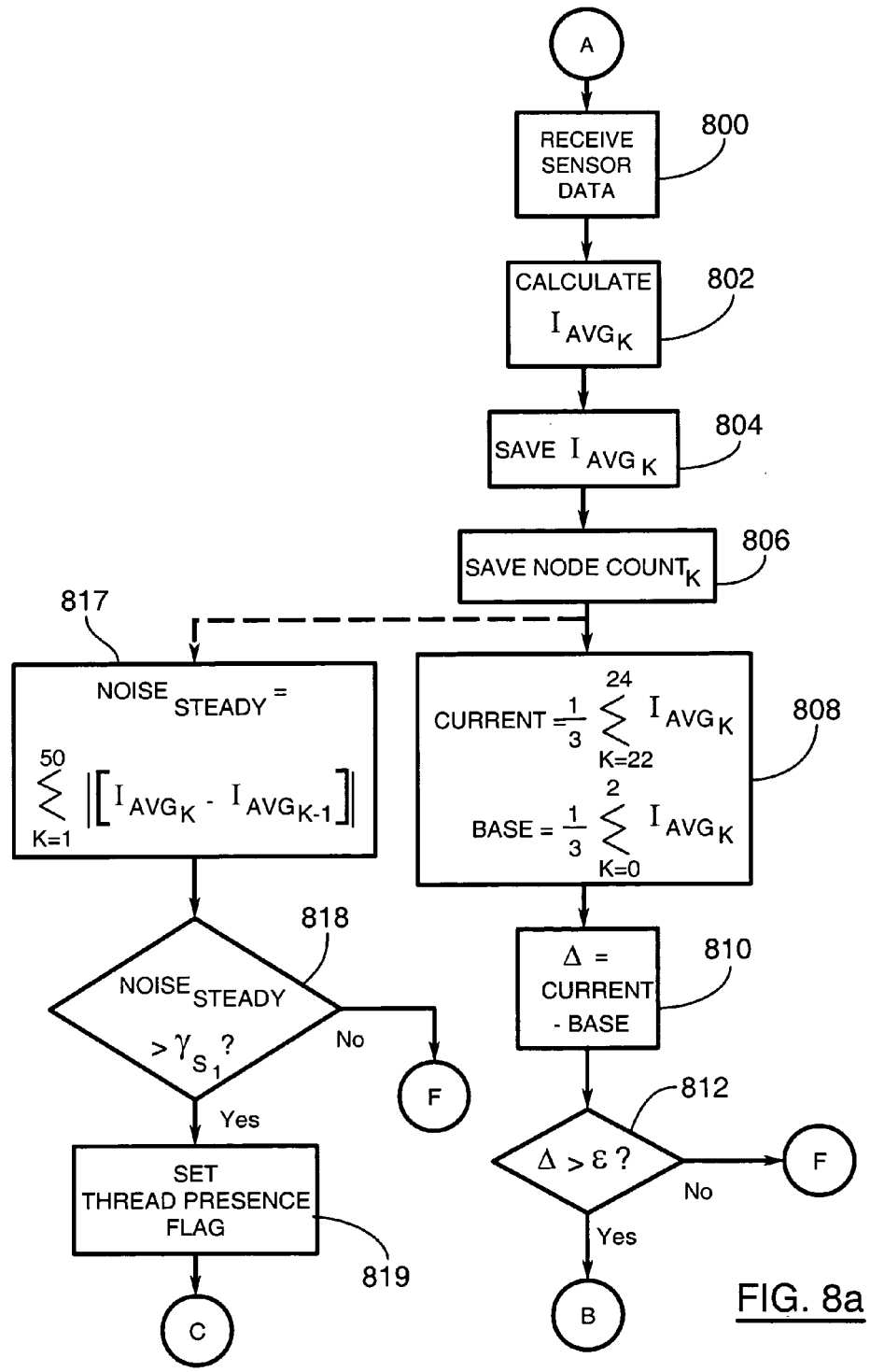
FIG. 8 (comprising FIGS. 8a to 8e) is a flow-chart depicting the method of determining thread presence with the fibre production monitoring system.
Figure 8B:
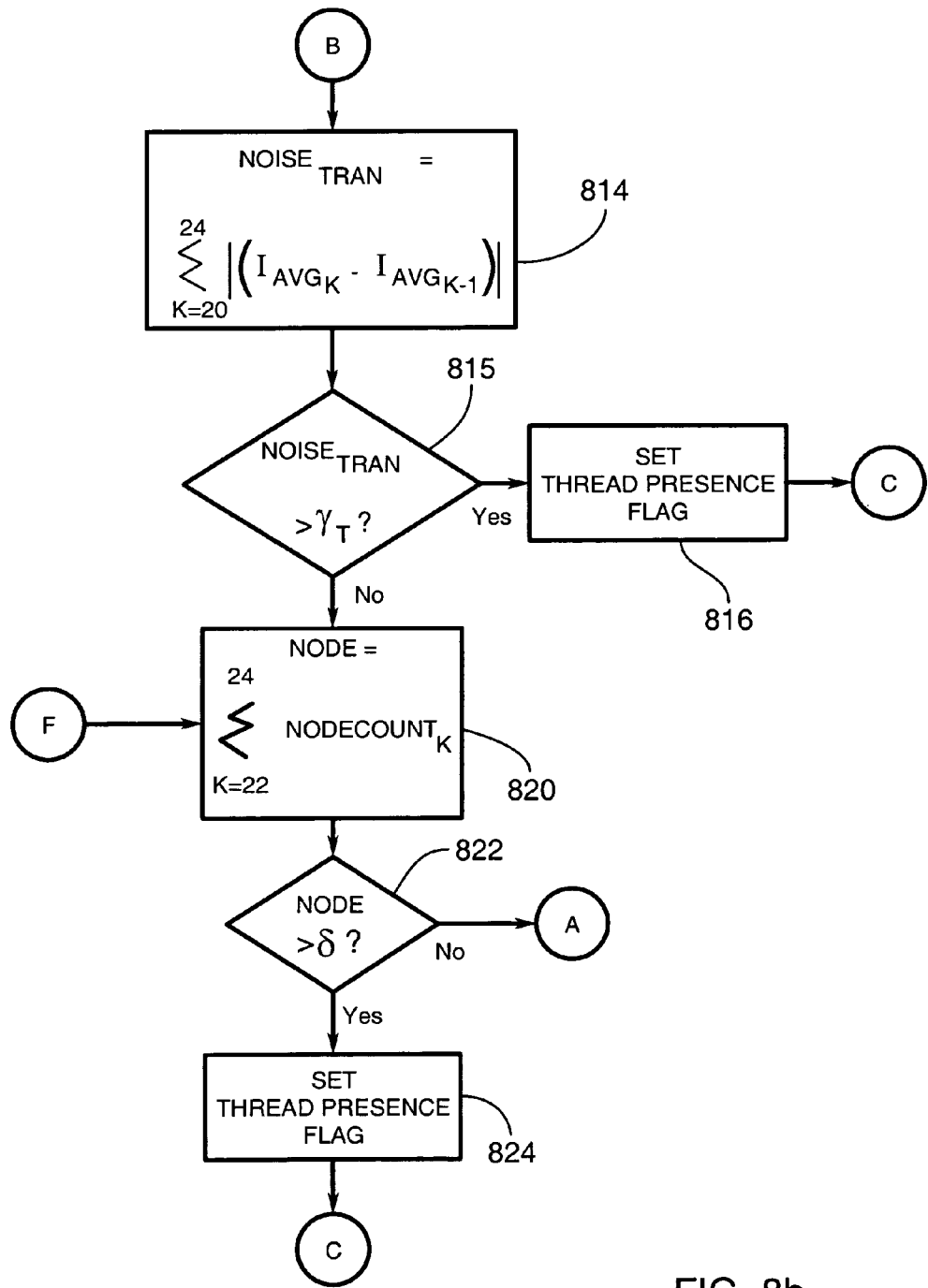
Figure 8C:
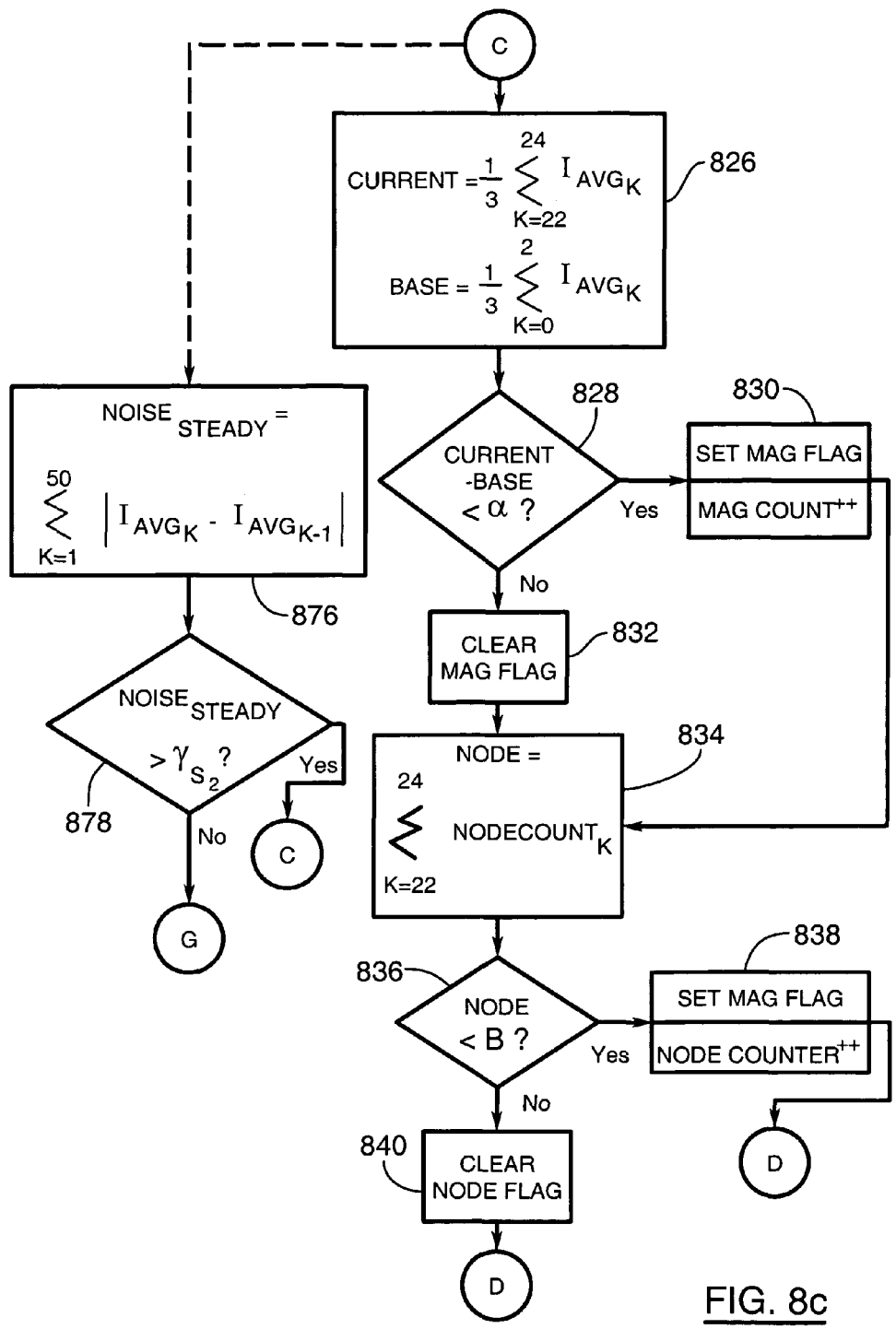
Figure 8D:
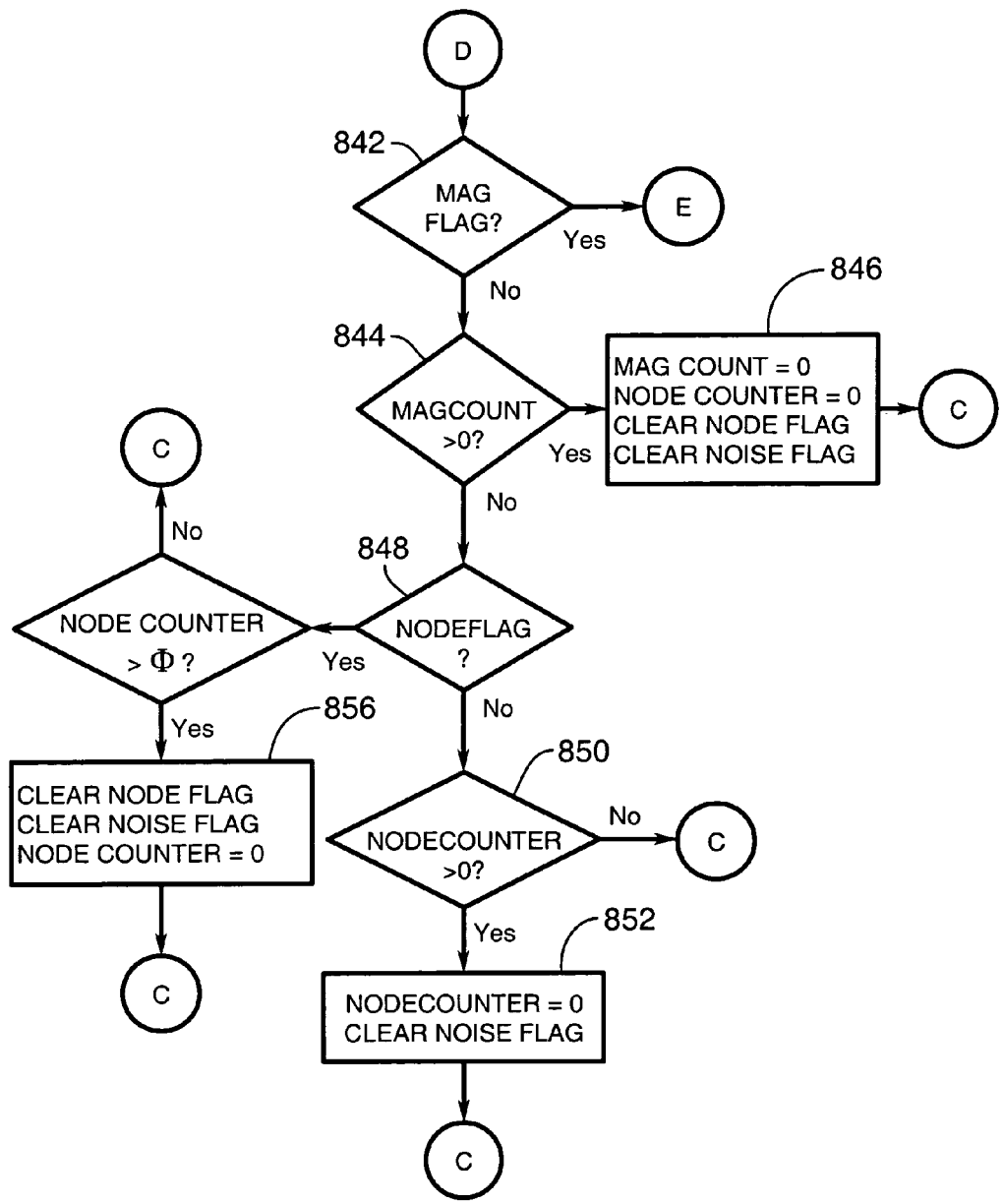
Figure 8E:
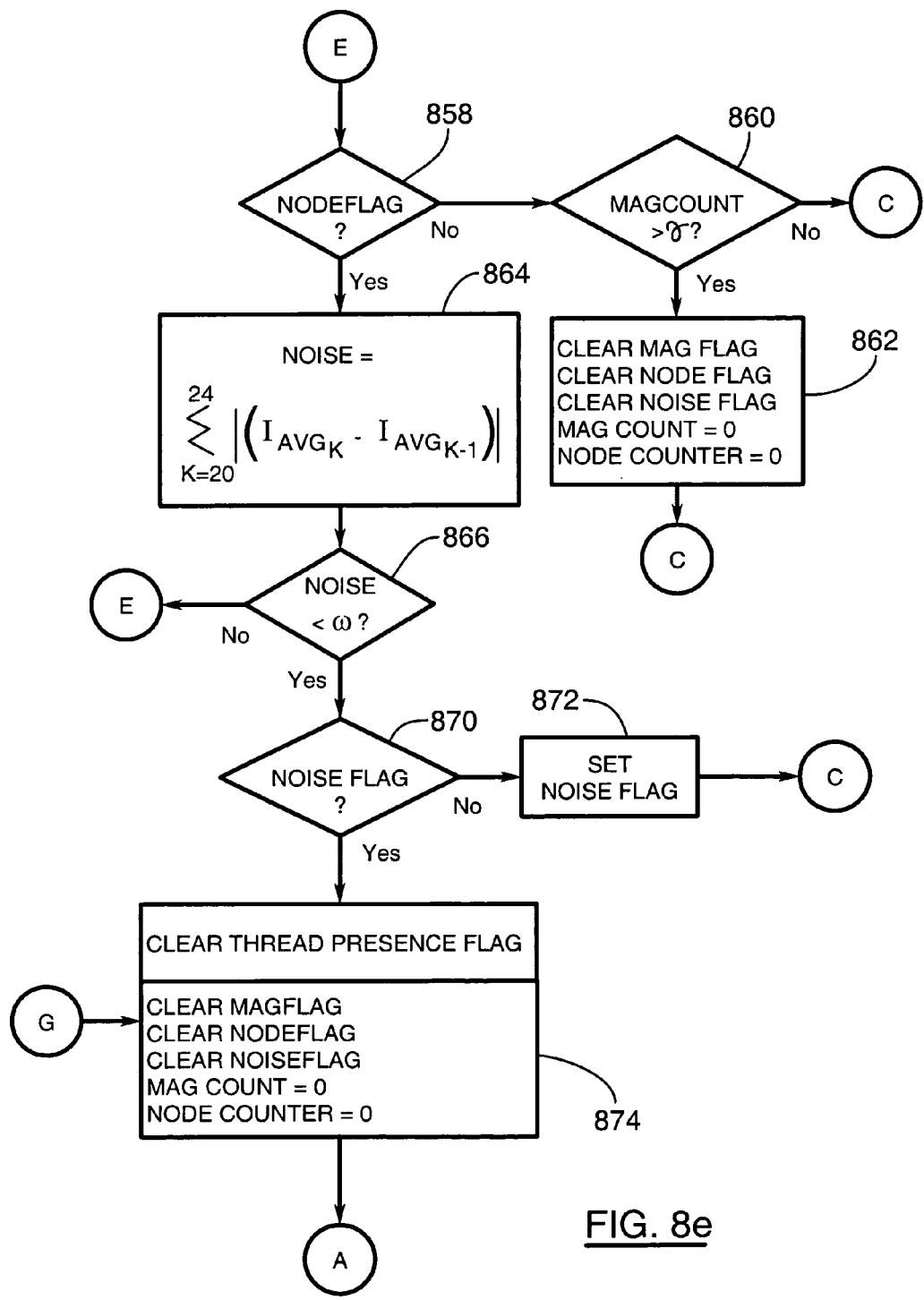

Further details of this process will be apparent from FIG. 7b. The following discussion assumes that a fibre has been detected at the sensor 200, either via a suitable sensor disposed on the threadline (that is monitored by the sensor monitor 300), or via the threadline presence algorithm (described below).

At step 700, the sensor processing unit 204 compares the current magnitude level against the average current induced in the electric field sensor 202. The sensor processing unit 204 calculates the average current from the peaks and troughs of the induced current, measured over a predetermined period of time.

If the current magnitude level falls with a range of the average current bound by an upper threshold limit and a lower threshold limit, the sensor processing unit 204 ignores the instant current measurement for the purposes of node count and node quality calculation. However, if the current magnitude level is greater than the average current by an upper threshold amount, at step 702 the sensor processing unit 204 classifies the current level as a possible peak. Conversely, if the current magnitude level is less than the average current by a lower threshold amount, at step 702 the sensor processing unit 204 classifies the current level as a possible trough.

Thereafter, at step 704, the sensor processing unit 204 compares the current level against the magnitude of the subsequent current level. If the sensor processing unit 204 classified the current level as a possible peak, and this magnitude level is greater than the subsequent current magnitude level, the sensor processing unit 204 continues to classify the previous magnitude level as a possible peak. Conversely, if the sensor processing unit 204 classified the instant current level as a possible trough, and the magnitude of the instant current level is less than the magnitude of the subsequent current level, the sensor processing unit 204 continues to classify the instant current level as a possible trough. Otherwise, the sensor processing unit 204 ignores the instant current level for the purposes of node count and node quality calculation, at step 706.

At step 708, the sensor processing unit 204 measures the magnitude or height of the instant current level relative to the magnitude of the last level identified as an actual peak or trough. Specifically, if the sensor processing unit 204 classified the instant current level as a possible peak, the sensor processing unit 204 compares the magnitude of the instant current level against the magnitude of the preceding trough. Conversely, if the sensor processing unit 204 classified the instant current level as a possible trough, the sensor processing unit 204 compares the magnitude of the instant current level against the magnitude of the preceding peak. If the magnitude of the instant current level exceeds the magnitude of the preceding peak/trough by a threshold amount, the sensor processing unit 204 continues to classify the instant current level as a possible peak/trough. Otherwise, the sensor processing unit 204 ignores the instant current level for the purposes of node count and node quality calculation, at step 710.

At step 712, the sensor processing unit 204 calculates the time period between the instant current level and the last measurement identified as an actual peak or trough. Subsequently, at step 714, the sensor processing unit 204 compares the calculated time period against an average time period. If the calculated time period falls with a range of the average time period bound by an upper threshold limit and a lower threshold limit, at step 715 the sensor processing unit 204 classifies the instant current level as an actual peak/trough. Conversely, if the calculated time period is greater than the average period by the upper threshold amount, or is less than the average period by the lower threshold amount, the sensor processing unit 204 ignores the instant current level for the purposes of node count and node quality calculation, at step 716.

If the sensor processing unit 204 classified the instant current level as an actual peak, at step 718 the sensor processing unit 204 increments a counter indicating that a node was detected. At step 720, the sensor processing unit 204 determines whether the predetermined measurement time span has elapsed. As discussed above, typically the predetermined measurement time span is 200 ms. If the predetermined measurement time span has not yet elapsed, the sensor processing unit 204 performs steps 700 to 718 again.

At step 722, the sensor processing unit 204 sets a node count variable equal to the value of the counter. The value of the node count variable is included in the data packet 250 as the node count. As will be apparent, although the sensor processing unit 204 increments the counter at step 718 only if a peak is detected, the sensor processing unit 204 may instead increment the counter only if a trough is detected.

By step 722, the sensor processing unit 204 has monitored the induced current over the complete measurement time span. Accordingly, at step 724, the sensor processing unit 204 determines the average of the heights of the peaks over the measurement time span by calculating the sum of those heights, and dividing the sum by the node count (determined at step 722). The calculated average is included in the data packet 250 as the node quality.

10. Thread Presence Algorithm

The thread presence algorithm monitors the output of the electric field sensor 202. Based upon the output of the electric field sensor 202, the algorithm is able to detect the presence of a fibre being drawn past the sensor 200, and is able to detect a break in the fibre. Specifically, the algorithm checks for the presence of a fibre by monitoring for an increase in one of the magnitude of the average fibre current and the transient fibre noise, the steady state fibre noise; and the fibre node count, as measured by the electric field sensor 202. The algorithm also checks for the absence of a fibre by monitoring for a decrease in one of the magnitude of the average fibre current and the transient noise, the steady state fibre noise and the fibre node count, as measured by the electric field sensor 202. Further details of this process will be described with reference to FIG. 8. Although, in the following example, the sensor monitor 300 monitors the magnitude of the average fibre current, the sensor monitor 300 may instead monitor the phase of the average fibre current.

As discussed above, the waveform of the current induced in the electric field sensor 202 as the fibre is drawn past the electric field sensor 202 consists of a series of peaks and a series of troughs. The sensor processing unit 204 monitors the current magnitude, and detects the peaks and the troughs in the induced current from the current measurements.

At step 800, the sensor monitor 300 receives a data packet 250 from one of the sensors 200. As discussed above, the data packet 250 includes a series of current magnitude and phase measurements, measured over a predetermined measurement time span. In addition, each data packet 250 includes a node count of the number of interlacing nodes encountered by the associated electric field sensor 202 within the measurement time span, and a measurement of the node quality of those nodes.

At step 802, the sensor monitor 300 identifies the local peak currents from the magnitude measurements contained in the data packet 250 (in accordance with steps 700 to 716), and then calculates the average amplitude for the current over the measurement time span. The sensor monitor 300 then stores the calculated average amplitude for the current measurement time span in the uppermost slot of the first sliding window 310, at step 804. The sensor monitor 300 also stores the calculated average amplitude value in the uppermost slot of the noise monitor 314. At step 806, the sensor monitor 300 copies the node count value from the data packet 250, and stores the node count value in the uppermost slot of the second sliding window 312. As will be apparent, since the sliding windows 310, 312 and the noise monitor 314 are forms of queues, the insertion of each new element therein will cause the existing elements to be shifted down one slot, and the element contained in slot 0 to be lost.

At step 808, the sensor monitor 300 calculates the mean value of the average current amplitude over the last three measurement time spans (as contained in slots 22, 23 and 24 of the first sliding window 310), and assigns this value to the variable CURRENT. The sensor monitor 300 also calculates the mean value of the average current amplitude over the first three measurement time spans (as contained in slots 0, 1 and 2 of the first sliding window 310), and assigns this value to the variable BASE. As will be apparent, the number of slots involved in these calculations need not be three, but can be varied as the volatility of the data requires. Also, the time separation between the CURRENT and BASE samples can be varied to take into account the mechanical noise in the threadlines, such as by altering the size of the first sliding window 310.

At step 810, the sensor monitor 300 calculates the difference between the value of the CURRENT variable and the BASE variable. The sensor monitor 300 then compares the difference (CURRENT−BASE) against a threshold minimum difference (eg. +300), at step 812. If the difference (CURRENT−BASE) is greater than the threshold minimum difference, at step 814 the sensor monitor 300 calculates the sum of the absolute values of the changes in the average current amplitude values over the last five measurement time spans (from the values contained in slots 19, 20, 21, 22, 23 and 24 of the noise monitor 314), and assigns this value to the variable $NOISE_{tran}$. Since this calculation only involves an assessment of the last five measurement time spans, the variable $NOISE_{tran}$ represents the transient noise measured by the electric field sensor 202 as the fibre moves past the sensor 200. As will be apparent, the number of slots involved in this calculation can be varied as the volatility of the data requires.

At step 815, the sensor monitor 300 compares the value of the $NOISE_{tran}$ variable against a threshold minimum transient noise. If the $NOISE_{tran}$ variable exceeds the threshold minimum transient noise, at step 816 the algorithm considers a fibre to be present at the sensor 200, and sets the thread presence flag 364 accordingly. The sensor monitor 300 then begins to check for a break in the fibre, at step 826.

In parallel with steps 808 to 816, the sensor monitor 300 uses a measurement of the steady state fibre noise to detect the presence of a fibre at the sensor 200. According to this parallel process, the sensor monitor 300 calculates the sum of the absolute values of the changes in the average current amplitude values over the entire fifty measurement time spans of the noise monitor 314, and assigns this value to the variable $NOISE_{steady}$ at step 817. Since this calculation involves an assessment of the entire noise monitor 314, the variable $NOISE_{steady}$ represents the steady state noise measured by the electric field sensor 202 as the fibre moves past the sensor 200.

At step 818, the sensor monitor 300 compares the value of the $NOISE_{steady}$ variable against a threshold minimum steady state noise. If the $NOISE_{steady}$ variable exceeds the threshold minimum steady state noise, at step 819 the algorithm considers a fibre to be present at the sensor 200, and sets the thread presence flag 364 accordingly. The sensor monitor 300 then begins to check for a break in the fibre, at step 826.

If the $NOISE_{tran}$ variable does not exceed the threshold minimum transient noise (eg. 20), or if the difference (CURRENT–BASE) is not greater than the threshold minimum difference, or if the $NOISE_{steady}$ variable does not exceed the threshold minimum steady state noise, at step 820 the sensor monitor 300 calculates the sum of the node counts over the last three measurement time spans (as contained in slots 22, 23 and 24 of the second sliding window 312), and assigns this value to the variable NODE. As discussed above, the number of slots involved in this calculation need not be three, but can be varied as the volatility of the data requires.

At step 822, the sensor monitor 300 compares the value of the NODE variable against a threshold minimum count. If the NODE variable does not exceed the threshold minimum count (eg. 100), the algorithm considers a fibre to not be present at the sensor 200, and returns to step 800.

However, if the NODE variable exceeds the threshold minimum count, at step 824 the algorithm considers a fibre to be present at the sensor 200, and sets the thread presence flag 364 accordingly. The sensor monitor 300 then begins to check for a break in the fibre, at step 826.

11. Thread Break Algorithm

To check for a break in the fibre, at step 826 the sensor monitor 300 calculates the mean value of the average current amplitude over the last three measurement time spans (as contained in slots 22, 23 and 24 of the first sliding window 310), and assigns this value to the variable CURRENT. The sensor monitor 300 also calculates the mean value of the average current amplitude over the first three measurement time spans (as contained in slots 0, 1 and 2 of the first sliding window 310), and assigns this value to the variable BASE. As discussed above, the number of slots involved in these calculations need not be three, but can be varied as the volatility of the data requires. Also, the time separation between the CURRENT and BASE samples can be varied to take into account the mechanical noise in the threadlines, such as by altering the size of the first sliding window 310.

At step 828, the sensor monitor 300 calculates the difference between the value of the CURRENT variable and the BASE variable, at step 828. If the difference (CURRENT–BASE) is less than a threshold minimum difference (eg. –300), at step 830 the sensor monitor 300 sets a MAG FLAG (thereby warning of a possible line break), and increments a MAG counter; the algorithm then advances to step 834. Otherwise, the sensor monitor 300 clears the MAG FLAG, at step 832.

At step 834, the sensor monitor 300 calculates the sum of the node counts over the last three measurement time spans (as contained in slots 22, 23 and 24 of the second sliding window 312), and assigns this value to the variable NODE. As discussed above, the number of slots involved in this calculation need not be three, but can be varied as the volatility of the data requires.

At step 836, the sensor monitor 300 compares the value of the NODE variable against a threshold minimum count. If the NODE variable is less than the threshold minimum count (eg. 100), at step 838 the sensor monitor 300 sets a NODE FLAG (thereby warning of a possible line break), and increments a NODE counter; the algorithm then advances to step 842. Otherwise, at step 840, the sensor monitor 300 clears the NODE FLAG.

At step 842, the sensor monitor 300 determines whether the MAG FLAG is set. If the MAG FLAG is clear (ie there has been no significant drop in sensor current magnitude), at step 844 the sensor monitor 300 determines whether the MAG counter is greater than zero. If the MAG counter is greater than zero (ie the MAG FLAG was previously triggered), the algorithm assumes there was only a temporary failure. Accordingly, at step 846 the sensor monitor 300 resets the MAG counter and the NODE counter, and clears the NODE FLAG and the NOISE FLAG. The algorithm then returns to step 826, to continue monitoring for a break in the fibre.

Alternately, if the sensor monitor 300 determines at step 844 that the MAG counter is not greater than zero (ie the MAG FLAG was not previously triggered), at step 848 the sensor monitor 300 determines whether the NODE FLAG is set. If the NODE FLAG is clear (ie there was no significant absence of interlacing nodes), at step 850 the sensor monitor 300 determines whether the NODE counter is greater than zero. If the NODE counter is greater than zero (ie. the NODE FLAG was previously triggered), the algorithm assumes that there was a temporary failure, such as a temporary interlace jet failure. Accordingly, at step 852 the sensor monitor 300 resets the NODE counter and clears the NOISE FLAG. The algorithm then returns to step 826, to continue monitoring for a break in the fibre. However, if the NODE counter is not greater than zero (ie. the NODE FLAG was not previously triggered), the algorithm returns to step 826 without clearing the NOISE FLAG or resetting the NODE counter.

If, at step 848, the sensor monitor 300 determines that the NODE FLAG is set (ie a possible line break due to insufficient node count), at step 854 the sensor monitor 300 determines whether the NODE counter is greater than a predetermined minimum node count value (eg. 35). If the NODE counter is greater than the minimum node count value, the algorithm assumes that the fibre is still present, since the MAG FLAG has not been set for the predetermined minimum node count value. Accordingly, at step 856 the sensor monitor 300 clears the NODE FLAG and the NOISE FLAG, and resets the NODE counter. The algorithm then returns to step 826 to continue monitoring for a break in the fibre. However, if the NODE counter is not greater than the predetermined minimum node count value, the algorithm returns to step 826 without clearing the NODE FLAG or the NOISE FLAG, or resetting the NODE counter.

On the other hand, if, at step 842, the sensor monitor 300 determines that the MAG FLAG is set (ie there has been a significant drop in sensor current magnitude), at step 858 the sensor monitor 300 determines whether the NODE FLAG is set. If the NODE FLAG is clear (ie there was no significant absence of interlacing nodes), at step 860 the sensor monitor 300 determines whether the MAG counter is greater than a predetermined minimum current amplitude count value (eg. 35). If the MAG counter is greater than the minimum current amplitude count value, the algorithm assumes that the fibre is still present, since the NODE FLAG has not been set for the predetermined minimum current amplitude count value. Accordingly, at step 862 the sensor monitor 300 clears the MAG FLAG, the NODE FLAG and the NOISE FLAG, and resets the MAG counter and the NODE counter. The algorithm then returns to step 826 to continue monitoring for a break in the fibre. However, if the MAG counter is not greater than the minimum current amplitude count value, the algorithm returns to step 826 without clearing the MAG FLAG, the NODE FLAG and the NOISE FLAG, or resetting the MAG counter and the NODE counter.

Alternately, if the sensor monitor 300 determines at step 858 that the NODE FLAG is set, (ie there was a significant absence of interlacing nodes), at step 864 the sensor monitor 300 calculates the sum of the absolute values of the changes in the average current amplitude values over the last five measurement time spans (from the values contained in slots 19, 20, 21, 22, 23 and 24 of the noise monitor 314), and assigns this value to the variable $NOISE_{tran}$. As will be apparent, the number of slots involved in this calculation can be varied as the volatility of the data requires.

The sensor monitor 300 then compares the value of the $NOISE_{tran}$ variable against a threshold minimum noise, at step 866. If the $NOISE_{tran}$ variable is not less than the threshold minimum noise (eg. 20), the algorithm considers a fibre to still be present at the sensor 200 (but may be slowly breaking), and returns to step 826 to continue monitoring for a complete break in the fibre.

However, if the $NOISE_{tran}$ variable is less than the threshold minimum noise, the algorithm determines whether the $NOISE_{tran}$ variable was less than the threshold minimum noise in a previous iteration. Accordingly, at step 870, the sensor monitor 300 determines whether the NOISE FLAG is set. If the NOISE FLAG is clear (ie there was no significant absence of transient noise in the preceding loop iteration), at step 872 the sensor monitor 300 sets the NOISE FLAG. The algorithm then returns to step 826 to continue monitoring for a break in the fibre.

If the sensor monitor 300 determined at step 870 that the NOISE FLAG is set (ie there was a significant absence of transient noise in the preceding loop iteration), the algorithm assumes that the fibre has broken. Accordingly, at step 874, the sensor monitor 300 clears the thread presence flag 364 to record the break in the fibre at the sensor 200. The sensor monitor 300 also clears the MAG FLAG, the NODE FLAG and the NOISE FLAG, and resets the MAG counter and the NODE counter. The algorithm then returns to step 800.

In parallel with steps 826 to 872, the sensor monitor 300 uses a measurement of the steady state fibre noise to detect a break in the fibre at the sensor 200. According to this parallel process, the sensor monitor 300 calculates the sum of the absolute values of the changes in the average current amplitude values over the entire fifty measurement time spans of the noise monitor 314, and assigns this value to the variable $NOISE_{steady}$ at step 876.

At step 878, the sensor monitor 300 compares the value of the $NOISE_{steady}$ variable against a threshold minimum steady state noise. If the $NOISE_{steady}$ variable does not exceed the threshold minimum steady state noise, the algorithm considers the fibre to have broken. Accordingly, as above, at step 874 the sensor monitor 300 clears the thread presence flag 364 to record the break in the fibre at the sensor 200. The algorithm then returns to step 800.

12. Cross-Over Event Detection Algorithm

The cross-over event detection algorithm monitors the output of the electric-field sensors 202 on a number of different threadlines, each threadline carrying a multi-filament fibre. From a change in the amplitude of a current signal induced in the electric field sensors as each fibre is drawn past the respective electric field sensor, the algorithm is able to detect the presence of a filament from one of the threadlines in the fibre of another one of the threadlines, ie that one or more filaments from the fibre on one of the threadlines has jumped or crossed-over to the fibre on another one of the threadlines. The cross-over event detection algorithm will now be discussed in general terms, followed by a more detailed discussion with reference to FIG. 9. Although, in the following example, the sensor monitor 300 monitors the magnitude of the average fibre current for each threadline, the sensor monitor 300 may instead monitor the phase of the average fibre current, node count or node quality for each threadline.

The sensor monitor 300 maintains a sliding window for each threadline. Each sliding window comprises a series of measurements of the amplitude of the current for the associated threadline. The sliding window is a form of queue that provides a snapshot of the activity at each threadline over a predetermined period of time. Thus, the insertion of each new amplitude value into each sliding window causes the existing elements in the sliding window to be shifted down one slot, and the element contained in the lowermost slot to be lost. Alternately, a block of new amplitude values can be inserted into the sliding window, in which case the existing elements in the sliding window would be block shifted downwards.

The sensor monitor 300 calculates for each threadline the average magnitude of the current at the lagging part of the respective sliding window. The sensor monitor 300 then assigns each calculated average amplitude value to a respective variable BASE (not the same variable as described above with reference to the thread presence algorithm) for each threadline Thus, in a two threadline fibre production system (having threadlines A and B), the sensor monitor 300 assigns the calculated average current amplitude for threadline A to the variable $BASE_A$, and the calculated average current amplitude for threadline B to the variable $BASE_B$.

The sensor monitor 300 also calculates for each threadline the average magnitude of the current at the leading part of the respective sliding window. The sensor monitor 300 then assigns each of these latter calculated average amplitude values to a respective variable CURRENT (not the same variable as described above with reference to the thread presence algorithm) for each threadline Thus, in a two threadline fibre production system (having threadlines A and B), the sensor monitor 300 assigns the average current amplitude for threadline A to the variable $CURRENT_A$, and the average current amplitude for threadline B to the variable $CURRENT_B$.

A fibre is said to have crossed over from one threadline to the other threadline (a cross-over event) if, for example, the value of $CURRENT_A$ exceeds the value of $BASE_A$, and the value of $BASE_B$ exceeds the value of $CURRENT_B$. The cross-over event has been corrected (either self-corrected or manually corrected) if, subsequent to the occurrence of a cross-over event, the value of $CURRENT_A$ substantially returns to the value of $BASE_A$, and the value of $CURRENT_B$ substantially returns to the value of $BASE_B$. The sensor monitor 300 is configured to continuously update the value of the BASE variables until a cross-over event is detected. However, in order to identify when the cross-over event has been corrected, the sensor monitor 300 maintains the value of the BASE variables (once a cross-over event has been detected) until the value of the CURRENT variables substantially returns to that of the BASE variables prior to the cross-over event.

The sensor monitor 300 uses the HOLD BASE REFERENCE flag to maintain an historical record of the BASE values that existed prior to the detection of a cross-over event of a line break event. This allows representation of the fiber production process under desired operating conditions to persist across these two events scenarios. If the HOLD BASE REFERENCE flag is clear (no cross-over event or line break has occurred), the sensor monitor 300 updates the value of the BASE variables. If the HOLD BASE REFERENCE flag is set (a cross-over event or line break has occurred), the sensor monitor 300 retains a copy of the BASE variable values, until the cross-over event or line break has been corrected and/or until the String up of the process fiber is successful. Monitoring for cross-over events persists even while the HOLD BASE REFERENCE flag is set.

Figure 9A:
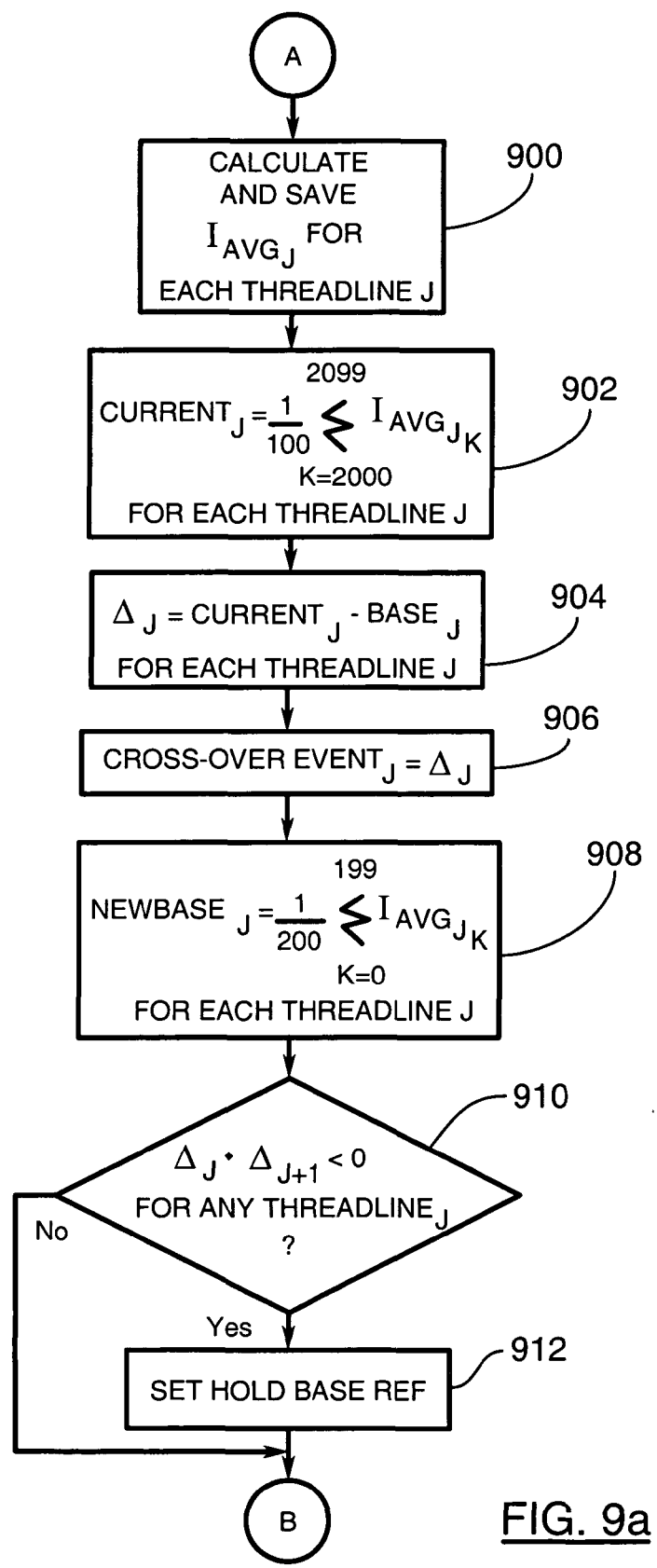
FIG. 9 (comprising FIGS. 9a and 9b) is a flow-chart depicting the method of determining cross-over events with the fibre production monitoring system.
Figure 9B:
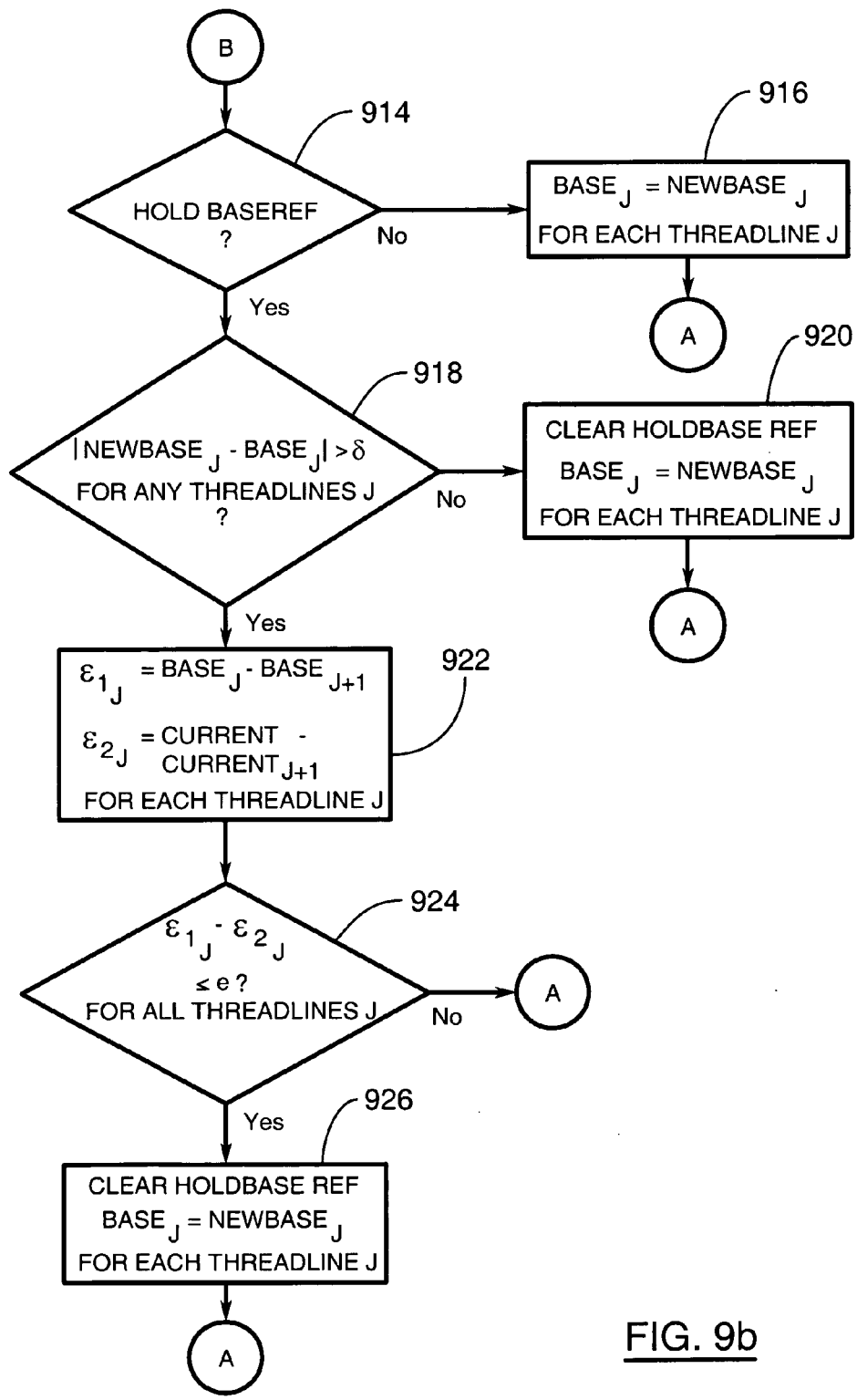

Further details of this process will be described with reference to FIG. 9. As discussed above, the waveform of the current induced in the electric field sensor 202 as the fibre is drawn past the electric field sensor 202 consists of a series of peaks and a series of troughs. The sensor processing unit 204 monitors the current magnitude, and detects the peaks and the troughs in the induced current from the current measurements. The sensor monitor 300 receives data packets 250 from a number of the sensors 200. Each data packet 250 includes a series of current magnitude and phase measurements, measured over a predetermined measurement time span. In addition, each data packet 250 includes a node count of the number of interlacing nodes encountered by the associated electric field sensor 202 within the measurement time span, and a measurement of the node quality of those nodes.

Accordingly, at step 900 the sensor monitor 300 identifies the local peak current values for each threadline from the magnitude measurements contained in each data packet 250 (in accordance with steps 700 to 716), and then calculates for each threadline the average amplitude for the current over each measurement time span. The sensor monitor 300 then saves each amplitude value in the respective sliding window. Preferably, each sliding window has 2100 slots (slots 0 to 2099) for saving 2100 such amplitude values. However, the number of slots need not be 2100, but can be varied as the volatility of the data requires.

At step 902, the sensor monitor 300 calculates for each threadline the average magnitude of the current at the leading part of the respective sliding window. Preferably, the sensor monitor 300 considers the last 100 current amplitude values in each sliding window. Thus, the sensor monitor 300 adds the current amplitudes in slots 2000 to 2099 for each threadline, and then divides each sum by the number of measurements (100). The sensor monitor 300 then assigns each of these latter calculated average amplitude values to the respective variable CURRENT for each threadline Thus, in a two threadline fibre production system (having threadlines A and B), the sensor monitor 300 assigns the average current amplitude for threadline A (calculated from slots 2000 to 2099) to the variable $CURRENT_A$, and the average current amplitude for threadline B (calculated from slots 2000 to 2099) to the variable $CURRENT_B$.

At step 904, the sensor monitor 300 calculates the change in amplitude of the average current amplitude values for each threadline, at step 908, and assigns each calculated change value to a respective variable Δ. Thus, in a two threadline fibre production system (having threadlines A and B), the sensor monitor 300 calculates the difference between $CURRENT_A$ and $BASE_A$, and assigns that value to the variable $\Delta_A$; and calculates the difference between $CURRENT_B$ and $BASE_B$, and assigns that value to the variable $\Delta_B$.

At step 906, the sensor monitor 300 inserts in the cross-over event field 370 of the data record 350 the calculated change values (eg. $\Delta_A$, $\Delta_B$) for each threadline, together with the sensor address of the sensor associated with each change value. The computer server 400 uses the change values included with the data record 350 to indicate to the operator of the computer server 400 the presence of a cross-over event, and the threadlines involved in the cross-over event.

At step 908, the sensor monitor 300 calculates for each threadline the average magnitude of the current at the leading part of the respective sliding window. Preferably, the sensor monitor 300 considers the first 200 current amplitude values in each sliding window. Thus, the sensor monitor 300 adds the current amplitudes in slots 0 to 199 for each threadline, and then divides each sum by the number of measurements (200). The sensor monitor 300 then assigns each new calculated average amplitude value to a new respective variable NEWBASE for each threadline Thus, in a two threadline fibre production system (having threadlines A and B), the sensor monitor 300 assigns the new calculated average current amplitude for threadline A (calculated from slots 0 to 199) to the variable $NEWBASE_A$, and the new calculated average current amplitude for threadline B (calculated from slots 0 to 199) to the variable $NEWBASE_B$.

At step 910, the sensor monitor 300 focuses on the direction of the calculated change values (eg. $\Delta_A$, $\Delta_B$) for each threadline. This step is referred to as a "self-term or in-line check". If the calculated change value for one of the threadlines is positive and the calculated change value for another one of the threadlines is negative, the algorithm assumes that a filament from the fibre on the threadline having the negative change value has jumped or crossed over to the fibre on the threadline having the positive change value. Accordingly, at step 912, the sensor monitor 300 sets the HOLD BASE REFERENCE flag, thereby indicating that the BASE variables should be saved until the cross-over event has been corrected.

At step 914, the sensor monitor 300 determines whether the HOLD BASE REFERENCE flag was set. If the HOLD BASE REFERENCE flag was not set, for each threadline the sensor monitor 300 assigns the value of the variable NEWBASE to the corresponding variable BASE, at step 916. The algorithm then returns to step 900.

However, if the HOLD BASE REFERENCE flag was set, the algorithm determines whether the cross-over event or line break has been corrected. Thus, for each threadline, the sensor monitor 300 compares the value of each NEWBASE variable against the value of the corresponding BASE variable, at step 918. If the absolute value of the difference between each variable pair is not greater than a predetermined threshold amount, the algorithm assumes the cross-over event or line break has been corrected. Accordingly, at step 920 the sensor monitor 300 clears the HOLD BASE REFERENCE flag, and for each threadline assigns the value of the variable NEWBASE to the corresponding variable BASE. The algorithm then returns to step 900.

If the sensor monitor 300 determines at step 918 that the absolute value of the difference between the value of any NEWBASE variable and the value of the corresponding BASE variable is greater than the threshold amount, the cross-over event or line break may have been manually corrected. However, the difference in temperature of the sensors 200 on the threadlines where the cross-over event or line break occurred between the instant the cross-over event or line break occurred and the instant the cross-over event or line break was corrected may have prevented the value of the NEWBASE variable from being within tolerance of the BASE variable (at step 918). Alternately, the electric field sensors 202 on the threadlines where the cross-over event or line break occurred may have been cleaned between the instant the cross-over event or line break occurred and the instant the cross-over event or line break was corrected, thereby preventing the value of the NEWBASE variable from being within tolerance of the BASE variable (at step 918).

Accordingly, to determine whether the cross-over event or line break has been manually corrected, at step 922 for each pair of threadlines the sensor monitor 300 calculates the difference in values of the BASE variables, and the difference in values of the CURRENT variables, and assigns each calculated difference to a respective variable $\in$. Thus, in a two threadline fibre production system (having threadlines A and B), the sensor monitor 300 calculates the difference between $BASE_A$ and $BASE_B$, and assigns that value to the variable $\in_1$; and calculates the difference between $CURRENT_A$ and $CURRENT_B$, and assigns that value to the variable $\in_2$.

Then, at step 924, the sensor monitor 300 compares, for each threadline pair, the value of each BASE difference (eg. $\in_1$) against the value of each CURRENT difference ($\in_2$). This step is referred to as a "cross-term check". If the difference between the two differences (eg. $\in_1 - \in_2$) is greater than a predetermined threshold amount, the algorithm assumes the cross-over event or line break has not been manually corrected. Accordingly, the algorithm returns to step 900. However, if the difference calculated at step 924 is not greater than a predetermined threshold amount, the algorithm assumes the cross-over event or line break has been manually corrected. Accordingly, at step 926 the sensor monitor 300 clears the HOLD BASE REFERENCE flag, and for each threadline assigns the value of the variable NEWBASE to the corresponding variable BASE. The algorithm then returns to step 900.

The present invention is defined by the claims appended hereto, with the foregoing description provided a preferred embodiment of the invention. Those of ordinary skill may envisage certain modifications to the claimed invention which, although not explicitly suggested herein, do not depart from the scope of the invention, as defined by the appended claims.

We claim:

1. A computer-based method of monitoring the production of fibre on a threadline, the method comprising the steps of:
   monitoring an amplitude of a current signal induced In an electric field sensor by a fibre drawn past the sensor;
   detecting peaks and troughs in the current signal from measurements of the amplitude; and
   determining a physical property of the fibre from the detected peaks and troughs,
   wherein the detecting step comprises the steps of:
      identifying local amplitude minimums and maximums from the amplitude measurements;
      calculating heights of the local maximums relative to the local minimums; and
      excluding those of the local maximums having an associated calculated height less than a predetermined threshold.

2. The method according to claim 1, wherein each of the non-excluded local maximums precedes one of the local minimums by a respective time period, and the method further comprises the steps:
   excluding those of the non-excluded local maximums having an associated time period greater than a threshold maximum time;
   excluding those of the non-excluded local maximums having an associated time period less than a threshold minimum time; and
   retaining remaining ones of the non-excluded local maximums.

3. The method according to claim 1, wherein the physical property is node count, and the physical property determining step comprises the steps of:
   segmenting the local amplitude measurements into time spans; and
   for each said time span, calculating a respective node count from the associated retained local maximums.

4. The method according to claim 1, wherein the physical property is node quality, and the physical property determining step comprises for each said time span calculating an average of the associated heights over the associated node count.

5. The method according to claim 1, wherein the electric field sensor comprises:
   an insulating substrate;
   a plurality of non-contacting electrodes disposed on the substrate; and
   a plurality of vias extending transversely through the substrate.

6. The method according to claim 5, wherein the electrodes comprise a first electrode portion and a second electrode portion interlaced with the first electrode portion, and the vias comprise a first via portion and a second via portion, the first portion of the vias being coupled to the first electrode portion, the second portion of the vias being coupled to the second electrode portion.

7. The method according to claim 6, wherein the electrodes are disposed parallel to each other on the substrate, and the vias extend at a right angle to the vias.

8. The method according to claim 7, wherein the electric field sensor includes an insulator disposed over the electrodes.

9. A computer-based method of monitoring the production of fibre on a threadline, the method comprising the steps of:
   monitoring an output of an electric field sensor disposed on a threadline;
   detecting the presence of a fibre being drawn past the sensor from an increase in one of an average current, a steady state noise and a node count measured by the electric field sensor; and
   detecting a break in the fibre from a decrease in the average current, the node count, and a transient noise measured by the electric field sensor, the decreases overlapping in time.

10. The method according to claim 9, wherein the average current is determined by detecting peaks in amplitude of a current induced in the electric field sensor, and calculating an average of the amplitude.

11. The method according to claim 10, wherein the average amplitude calculating step comprises the steps of segmenting the peaks into time spans, and calculating a mean value for an average of the magnitude of the peaks over each said time span.

12. The method according to claim 9, wherein the noise is determined by detecting peaks in amplitude of a current induced in the electric field sensor, segmenting the peaks into time spans, and summing the magnitude of the peaks over each said time span.

13. The method according to claim 9, wherein the node count is determined by detecting peaks in amplitude of a current induced In the electric field sensor, and calculating a node count from the detected peaks.

14. The method according to claim 13, wherein the node count calculating step comprises the steps of segmenting the peaks into time spans, and counting the peaks for each said time span.

15. A computer-based method of monitoring the production of fibre on a threadline, the method comprising the steps of:

monitoring an output of a plurality of electric field sensors each disposed on a respective one of a plurality of threadlines, each said threadline carrying a multi-filament fibre; and from a change in amplitude of a current signal induced in the electric field sensors as each said fibre is drawn past the respective electric field sensor, detecting the presence of a filament from one of the threadlines in the fibre of another one of the threadlines.

16. The method according to claim 15, wherein the presence of a filament is detected by monitoring for a positive change in the amplitude on the one threadline, and monitoring for a negative change in the amplitude on the another threadline.

* * * * *